US011689313B2

(12) United States Patent
Akkarakaran et al.

(10) Patent No.: US 11,689,313 B2
(45) Date of Patent: Jun. 27, 2023

(54) RE-ALLOCATION OF POSITIONING REFERENCE SIGNAL RESOURCES TO ACCOMMODATE ANOTHER TRANSMISSION

(71) Applicant: QUALCOMM Incorporated, San Diego, CA (US)

(72) Inventors: Sony Akkarakaran, Poway, CA (US); Tao Luo, San Diego, CA (US); Alexandros Manolakos, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 16/502,003

(22) Filed: Jul. 2, 2019

(65) Prior Publication Data

US 2020/0014487 A1 Jan. 9, 2020

(30) Foreign Application Priority Data

Jul. 6, 2018 (GR) .............................. 20180100315

(51) Int. Cl.
*H04L 1/00* (2006.01)
*H04L 5/00* (2006.01)
(Continued)

(52) U.S. Cl.
CPC ............ *H04L 1/0013* (2013.01); *H04L 5/005* (2013.01); *H04W 72/0446* (2013.01); *H04W 72/10* (2013.01); *H04W 72/1263* (2013.01)

(58) Field of Classification Search
CPC ..... H04L 1/0013; H04L 5/005; H04L 5/0073; H04W 72/1263; H04W 72/0446; H04W 72/10

See application file for complete search history.

(56) References Cited

U.S. PATENT DOCUMENTS 11,026,237 B2   6/2021   Zhang et al.
2010/0273506 A1* 10/2010   Stern-Berkowitz .........
                                          H04L 5/0048
                                          455/456.1
(Continued)

FOREIGN PATENT DOCUMENTS

WO       2015094914 A1   6/2015
WO    WO-2018203278 A1  11/2018

OTHER PUBLICATIONS

International Search Report and Written Opinion—PCT/US2019/040631—ISA/EPO—dated Oct. 11, 2019.
(Continued)

*Primary Examiner* — Christine Ng
(74) *Attorney, Agent, or Firm* — Campbell C. Chiang

(57) ABSTRACT

In an embodiment, a cell punctures resource(s) allocated to transmission of UL or DL PRS(s). The cell communicates (e.g., receives or transmits) UL or DL higher-priority signal(s) on the punctured resource(s), and communicates the UL or DL PRS(s) on the non-punctured resource(s). In another embodiment, a second cell neighboring a first cell schedules and transmits the UL or DL higher-priority signal(s) on part of the first cell's PRS resource(s). In another embodiment, the first cell receives an indication of the UL or DL higher-priority signal(s) scheduled for transmission by the second cell, and punctures its PRS resource(s) to reduce interference on the second cell's UL or DL higher-priority signal(s). In a further embodiment, a UE receives an indication of puncturing and selectively modifies its PRS processing on the punctured resource(s).

28 Claims, 13 Drawing Sheets

(51) Int. Cl.
*H04W 72/1263* (2023.01)
*H04W 72/0446* (2023.01)
*H04W 72/10* (2009.01)

(56) References Cited

U.S. PATENT DOCUMENTS

| | | | | |
|---|---|---|---|---|
| 2010/0322184 | A1* | 12/2010 | Xiao | H04L 5/0051 370/330 |
| 2011/0081933 | A1* | 4/2011 | Suh | G01S 5/0236 455/509 |
| 2011/0252139 | A1 | 10/2011 | Bhattad et al. | |
| 2012/0083288 | A1* | 4/2012 | Siomina | H04W 64/00 455/456.1 |
| 2012/0250551 | A1* | 10/2012 | Sartori | H04W 24/10 370/252 |
| 2016/0037545 | A1 | 2/2016 | Prajapati | |
| 2016/0080121 | A1 | 3/2016 | Kim et al. | |
| 2016/0192379 | A1 | 6/2016 | Behravan et al. | |
| 2017/0237592 | A1* | 8/2017 | Yang | H04L 27/2614 375/260 |
| 2017/0367116 | A1 | 12/2017 | Li et al. | |
| 2018/0007625 | A1 | 1/2018 | Yu et al. | |
| 2018/0054792 | A1* | 2/2018 | Lee | H04W 64/00 |
| 2018/0070341 | A1 | 3/2018 | Islam et al. | |
| 2018/0097596 | A1 | 4/2018 | Palanivelu et al. | |
| 2018/0146485 | A1 | 5/2018 | Yang et al. | |
| 2019/0089568 | A1 | 3/2019 | Abedini et al. | |
| 2019/0098608 | A1 | 3/2019 | Yi et al. | |
| 2019/0162817 | A1* | 5/2019 | Priyanto | H04B 1/713 |
| 2019/0313443 | A1 | 10/2019 | Li et al. | |
| 2019/0380056 | A1* | 12/2019 | Lee | H04L 43/0882 |
| 2020/0092880 | A1* | 3/2020 | Choi | H04W 72/042 |
| 2020/0154449 | A1 | 5/2020 | Akkarakaran et al. | |
| 2020/0163068 | A1* | 5/2020 | Takeda | H04W 72/042 |
| 2020/0228240 | A1 | 7/2020 | Hong et al. | |
| 2020/0351815 | A1* | 11/2020 | Kim | H04L 5/0048 |
| 2022/0150906 | A1 | 5/2022 | Akkarakaran et al. | |

OTHER PUBLICATIONS

ITL: "Support of OTDOA in NB-IoT", 3GPP Draft, R1-1610221, 3GPP TSG RAN WG1 Meeting #86bis, 3rd Generation Partnership Project (3GPP), Mobile Competence Centre, 650, Route Des Lucioles, F-06921 Sophia-Antipolis Cedex, France, vol. RAN WG1, No. Lisbon, Portugal, Oct. 10, 2016-Oct. 14, 2016, Oct. 9, 2016 (Oct. 9, 2016), XP051150240, 10 Pages, Retrieved from the Internet: URL:http://www.3gpp.org/ftp/Meetings_3GPP_SYNC/RAN1/Docs/ [retrieved on Oct. 9, 2016].

NEC Group: "Collision of PMCH and PRS Transmission in the Same MBSFN Subframe", 3GPP Draft, 3GPP TSG-RAN WG1 #64, R1-110747, Collision of PMCH and PRS Transmission in the Same Subframe, 3rd Generation Partnership Project (3GPP), Mobile Competence Centre, 650, Route Des Lucioles, F-06921, Sophia-Antipolis Cedex, France, vol. RAN WG1, No. Taipei, Taiwan, Feb. 21. 2011-Feb. 25, 2011, Feb. 15, 2011 (Feb. 15, 2011), XP050490549, 3 pages, [retrieved on Feb. 15, 2011], Collision of PMCH and PRS Transmissions, p. 1, paragraph 2—p. 3.

PANTECH: "Discussion on Collision Avoidance Between CSI-RS and PRS", 3GPP Draft, 3GPP TSG RAN WG1 Meeting #64, R1-110753, 3rd Generation Partnership Project (3GPP), Mobile Competence Centre, 650, Route Des-Lucioles, F-06921, Sophia-Antipolis Cedex, France, vol. RAN WG1, No. Taipei, Taiwan, Feb. 21, 2011-Feb. 25, 2011, Feb. 15, 2011 (Feb. 15, 2011), XP050490553, 5 pages, [retrieved on Feb. 15, 2011], Discussion, p. 1, paragraph 2—p. 4.

NOKIA., et al., "Handling of Mapping of ePDCCH in Presence of Other Signals", R1-122422, 3GPP TSG RAN WG1 Meeting #69, Prague, Czech Republic, May 21-25, 2012, 4 Pages.

Qualcomm Incorporated: "NPRS Enhancement", R1-1807094, 3GPP TSG RAN WG1 Meeting #93, Busan, Korea, May 21-25, 2018, pp. 1-9.

* cited by examiner

RE-ALLOCATION OF POSITIONING REFERENCE SIGNAL RESOURCES TO ACCOMMODATE ANOTHER TRANSMISSION

CROSS-REFERENCE TO RELATED APPLICATION

The present Application for Patent claims priority under 35 U.S.C. § 119 to Greek Patent Application No. 20180100315, entitled "RE-ALLOCATION OF POSITIONING REFERENCE SIGNAL RESOURCES TO ACCOMMODATE ANOTHER TRANSMISSION", filed with the Greek Patent and Trademark Office on Jul. 6, 2018, and assigned to the assignee hereof and hereby expressly incorporated herein by reference in its entirety.

TECHNICAL FIELD

Various aspects described herein generally relate to re-allocation of positioning reference signal resources to accommodate another transmission.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Some wireless communication networks, such as 5G, support operation at very high and even extremely-high frequency (EHF) bands, such as millimeter wave (mmW) frequency bands (generally, wavelengths of 1 mm to 10 mm, or 30 to 300 GHz). These extremely high frequencies may support very high throughput such as up to six gigabits per second (Gbps). One of the challenges for wireless communication at very high or extremely high frequencies, however, is that a significant propagation loss may occur due to the high frequency. As the frequency increases, the wavelength may decrease, and the propagation loss may increase as well. At mmW frequency bands, the propagation loss may be severe. For example, the propagation loss may be on the order of 22 to 27 dB, relative to that observed in either the 2.4 GHz, or 5 GHz bands.

Propagation loss is also an issue in Multiple Input-Multiple Output (MIMO) and massive MIMO systems in any band. The term MIMO as used herein will generally refer to both MIMO and massive MIMO. MIMO is a method for multiplying the capacity of a radio link by using multiple transmit and receive antennas to exploit multipath propagation. Multipath propagation occurs because radio frequency (RF) signals not only travel by the shortest path between the transmitter and receiver, which may be a line of sight (LOS) path, but also over a number of other paths as they spread out from the transmitter and reflect off other objects such as hills, buildings, water, and the like on their way to the receiver. A transmitter in a MIMO system includes multiple antennas and takes advantage of multipath propagation by directing these antennas to each transmit the same RF signals on the same radio channel to a receiver. The receiver is also equipped with multiple antennas tuned to the radio channel that can detect the RF signals sent by the transmitter. As the RF signals arrive at the receiver (some RF signals may be delayed due to the multipath propagation), the receiver can combine them into a single RF signal. Because the transmitter sends each RF signal at a lower power level than it would send a single RF signal, propagation loss is also an issue in a MIMO system.

To address propagation loss issues in mmW band systems and MIMO systems, transmitters may use beamforming to extend RF signal coverage. In particular, transmit beamforming is a technique for emitting an RF signal in a specific direction, whereas receive beamforming is a technique used to increase receive sensitivity of RF signals that arrive at a receiver along a specific direction. Transmit beamforming and receive beamforming may be used in conjunction with each other or separately, and references to "beamforming" may hereinafter refer to transmit beamforming, receive beamforming, or both. Traditionally, when a transmitter broadcasts an RF signal, it broadcasts the RF signal in nearly all directions determined by the fixed antenna pattern or radiation pattern of the antenna. With beamforming, the transmitter determines where a given receiver is located relative to the transmitter and projects a stronger downlink RF signal in that specific direction, thereby providing a faster (in terms of data rate) and stronger RF signal for the receiver. To change the directionality of the RF signal when transmitting, a transmitter can control the phase and relative amplitude of the RF signal broadcasted by each antenna. For example, a transmitter may use an array of antennas (also referred to as a "phased array" or an "antenna array") that creates a beam of RF waves that can be "steered" to point in different directions, without actually moving the antennas. Specifically, the RF current is fed to the individual antennas with the correct phase relationship so that the radio waves from the separate antennas add together to increase the radiation in a desired direction, while cancelling the radio waves from the separate antennas to suppress radiation in undesired directions.

To support position estimations in terrestrial wireless networks, a mobile device can be configured to measure and report the observed time difference of arrival (OTDOA) or reference signal timing difference (RSTD) between reference RF signals received from two or more network nodes (e.g., different base stations or different transmission points (e.g., antennas) belonging to the same base station). The mobile device may also transmit its own ranging signal(s) that are measured by the two or more network nodes, either as part of a separate positioning procedure or to facilitate calculation of round trip propagation time (RTT) between the mobile device and the two or more network nodes.

SUMMARY

An embodiment is directed to a method of operating a cell, comprising puncturing a subset of a set of resources allocated to transmission of one or more Positioning Reference Signals (PRSs) to facilitate communication of one or more higher-priority signals on the punctured subset of the set of resources, and communicating at least one of the one or more PRSs on a non-punctured subset of the set of resources.

Another embodiment is directed to a method of operating a user equipment (UE), comprising receiving, from a first cell, an indication that a subset of a set of resources allocated to transmission of one or more Positioning Reference Signals (PRSs) are to be punctured, and selectively modifying a manner in which at least one of the one or more PRSs is processed at the UE in response to the indication.

Another embodiment is directed to a method of operating a second cell that neighbors a first cell, comprising scheduling one or more higher-priority signals for transmission by the second cell on a set of resources allocated to transmission of one or more Positioning Reference Signals (PRSs) by the first cell, and transmitting the one or more higher-priority signals on the set of resources.

Another embodiment is directed to a cell, comprising means for puncturing a subset of a set of resources allocated to transmission of one or more Positioning Reference Signals (PRSs) to facilitate communication of one or more higher-priority signals on the punctured subset of the set of resources, and means for communicating at least one of the one or more PRSs on a non-punctured subset of the set of resources.

Another embodiment is directed to a user equipment (UE), comprising means for receiving, from a first cell, an indication that a subset of a set of resources allocated to transmission of one or more Positioning Reference Signals (PRSs) are to be punctured, and means for selectively modifying a manner in which at least one of the one or more PRSs is processed at the UE in response to the indication.

Another embodiment is directed to a second cell that neighbors a first cell, comprising means for scheduling one or more higher-priority signals for transmission by the second cell on a set of resources allocated to transmission of one or more Positioning Reference Signals (PRSs) by the first cell, and means for transmitting the one or more higher-priority signals on the set of resources.

Another embodiment is directed to a cell, comprising a memory, and at least one processor coupled to the memory and at least one transceiver and configured to puncture a subset of a set of resources allocated to transmission of one or more Positioning Reference Signals (PRSs) to facilitate communication of one or more higher-priority signals on the punctured subset of the set of resources, and communicate at least one of the one or more PRSs on a non-punctured subset of the set of resources.

Another embodiment is directed to a user equipment (UE), comprising a memory, and at least one processor coupled to the memory and at least one transceiver and configured to receive, from a first cell, an indication that a subset of a set of resources allocated to transmission of one or more Positioning Reference Signals (PRSs) are to be punctured, and selectively modify a manner in which at least one of the one or more PRSs is processed at the UE in response to the indication.

Another embodiment is directed to a second cell that neighbors a first cell, comprising a memory, and at least one processor coupled to the memory and at least one transceiver and configured to schedule one or more higher-priority signals for transmission by the second cell on a set of resources allocated to transmission of one or more Positioning Reference Signals (PRSs) by the first cell, and transmit the one or more higher-priority signals on the set of resources.

Another embodiment is directed to a non-transitory computer-readable medium containing instructions stored thereon, which, when executed by a cell, cause the cell to perform operations, the instructions comprising at least one instruction to cause the cell to puncture a subset of a set of resources allocated to transmission of one or more Positioning Reference Signals (PRSs) to facilitate communication of one or more higher-priority signals on the punctured subset of the set of resources, and at least one instruction to cause the cell to communicate at least one of the one or more PRSs on a non-punctured subset of the set of resources.

Another embodiment is directed to a non-transitory computer-readable medium containing instructions stored thereon, which, when executed by a user equipment (UE), cause the UE to perform operations, the instructions comprising at least one instruction to cause the UE to receive, from a first cell, an indication that a subset of a set of resources allocated to transmission of one or more Positioning Reference Signals (PRSs) are to be punctured, and at least one instruction to cause the UE to selectively modify a manner in which at least one of the one or more PRSs is processed at the UE in response to the indication.

Another embodiment is directed to a non-transitory computer-readable medium containing instructions stored thereon, which, when executed by a second cell that neighbors a first cell, cause the second cell to perform operations, the instructions comprising at least one instruction to cause the second cell to schedule one or more higher-priority signals for transmission by the second cell on a set of resources allocated to transmission of one or more Positioning Reference Signals (PRSs) by the first cell, and at least one instruction to cause the second cell to transmit the one or more higher-priority signals on the set of resources.

BRIEF DESCRIPTION OF THE DRAWINGS

A more complete appreciation of the various aspects described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
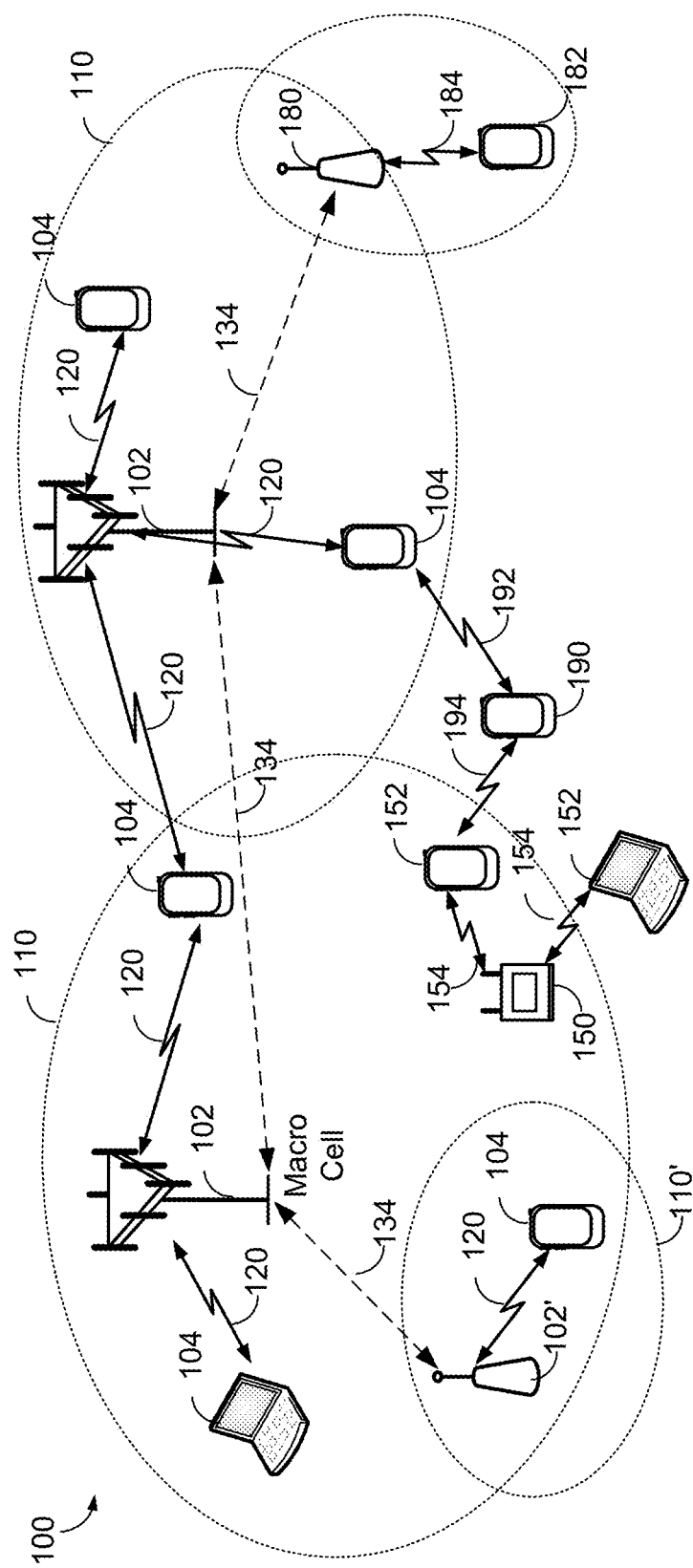
FIG. 1 illustrates an exemplary wireless communications system, according to various aspects.

Various aspects described herein generally relate to re-allocation of positioning reference signal resources to accommodate another transmission.

These and other aspects are disclosed in the following description and related drawings to show specific examples relating to exemplary aspects. Alternate aspects will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects disclosed herein.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "user equipment" (or "UE"), "user device," "user terminal," "client device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof may interchangeably refer to any suitable mobile or stationary device that can receive wireless communication and/or navigation signals. These terms are also intended to include devices which communicate with another device that can receive wireless communication and/or navigation signals such as by short-range wireless, infrared, wireline connection, or other connection, regardless of whether satellite signal reception, assistance data reception, and/or position-related processing occurs at the device or at the other device. In addition, these terms are intended to include all devices, including wireless and wireline communication devices, that can communicate with a core network via a radio access network (RAN), and through the core network the UEs can be connected with external networks such as the Internet and with other UEs. Of course, other mechanisms of connecting to the core network and/or the Internet are also possible for the UEs, such as over a wired access network, a wireless local area network (WLAN) (e.g., based on IEEE 802.11, etc.) and so on. UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cells (high power cellular base stations) and/or small cells (low power cellular base stations), wherein the macro cells may include Evolved NodeBs (eNBs), where the wireless communications system 100 corresponds to an LTE network, or gNodeBs (gNBs), where the wireless communications system 100 corresponds to a 5G network or a combination of both, and the small cells may include femtocells, picocells, microcells, etc.

The base stations 102 may collectively form a Radio Access Network (RAN) and interface with an Evolved Packet Core (EPC) or Next Generation Core (NGC) through backhaul links. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, although not shown in FIG. 1, geographic coverage areas 110 may be subdivided into a plurality of cells (e.g., three), or sectors, each cell corresponding to a single antenna or array of antennas of a base station 102. As used herein, the term "cell" or "sector" may correspond to one of a plurality of cells of a base station 102, or to the base station 102 itself, depending on the context.

While neighboring macro cell geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro cell base stations 102. A network that includes both small cell and macro cells may be known as a heterogeneous network. A heterogeneous network may also include Home eNBs (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a mmW base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 may utilize beamforming 184 with the UE 182 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

The wireless communications system 100 may further include one or more UEs, such as UE 190, that connects indirectly to one or more communication networks via one or more device-to-device (D2D) peer-to-peer (P2P) links. In the embodiment of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192-194 may be supported with any well-known D2D radio access technology (RAT), such as LTE Direct (LTE-D), WiFi Direct (WiFi-D), Bluetooth, and so on.

Figure 2A:
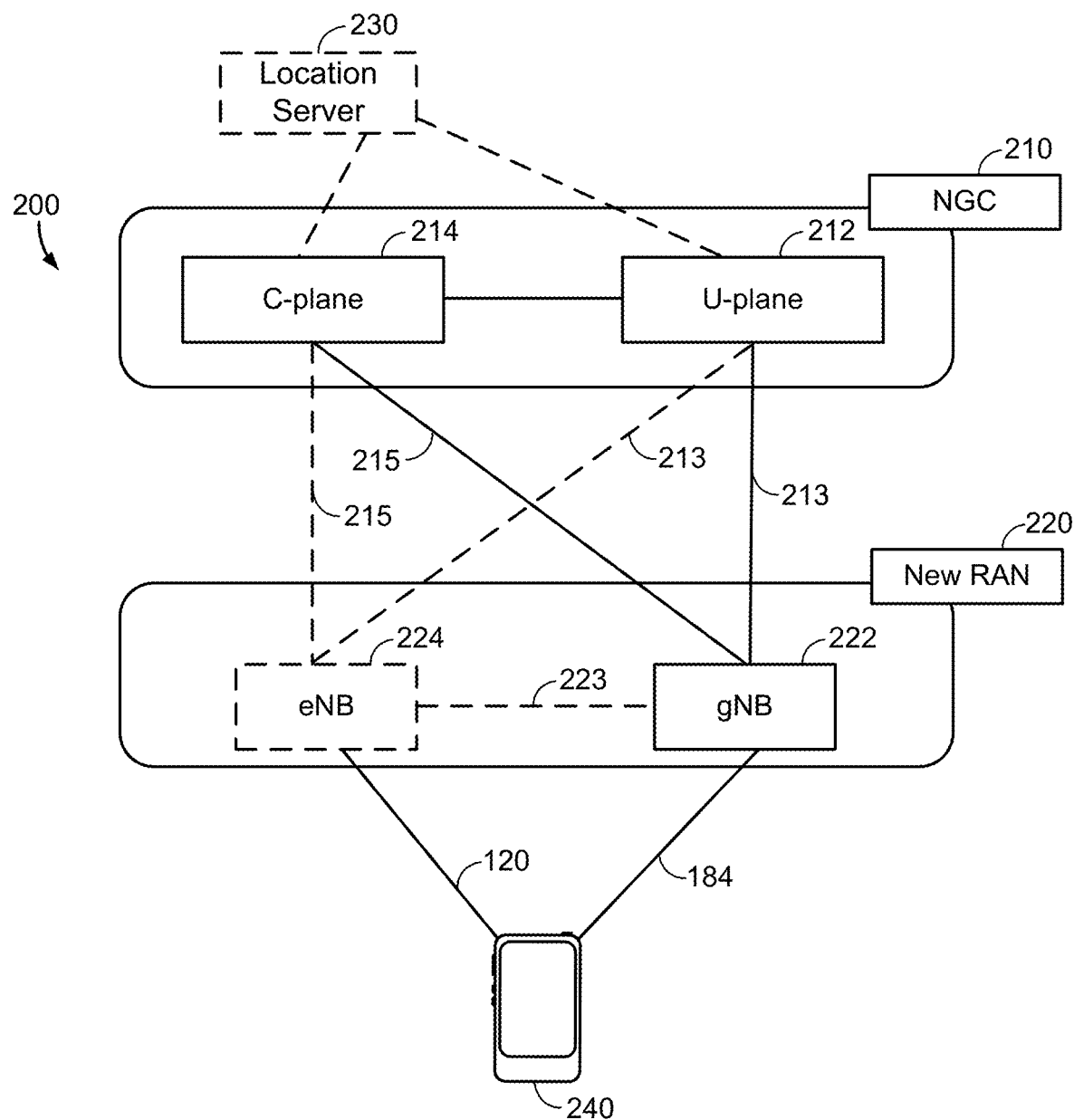
FIGS. 2A and 2B illustrate example wireless network structures, according to various aspects.

According to various aspects, FIG. 2A illustrates an example wireless network structure 200. For example, an NGC 210 can be viewed functionally as control plane functions 214 (e.g., UE registration, authentication, network access, gateway selection, etc.), and user plane functions 212 (e.g., UE gateway function, access to data networks, Internet protocol (IP) routing, etc.), which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 152, UE 182, UE 190, etc.). Another optional aspect may include a location server 230 that may be in communication with the NGC 210 to provide location assistance for UEs 240. The location server 230 can be implemented as a plurality of structurally separate servers, or alternately may each correspond to a single server. The location server 230 can be configured to support one or more location services for UEs 240 that can connect to the location server 230 via the core network, NGC 210, and/or via the Internet (not illustrated). Further, the location server 230 may be integrated into a component of the core network, or alternatively may be external to the core network.

Figure 2B:
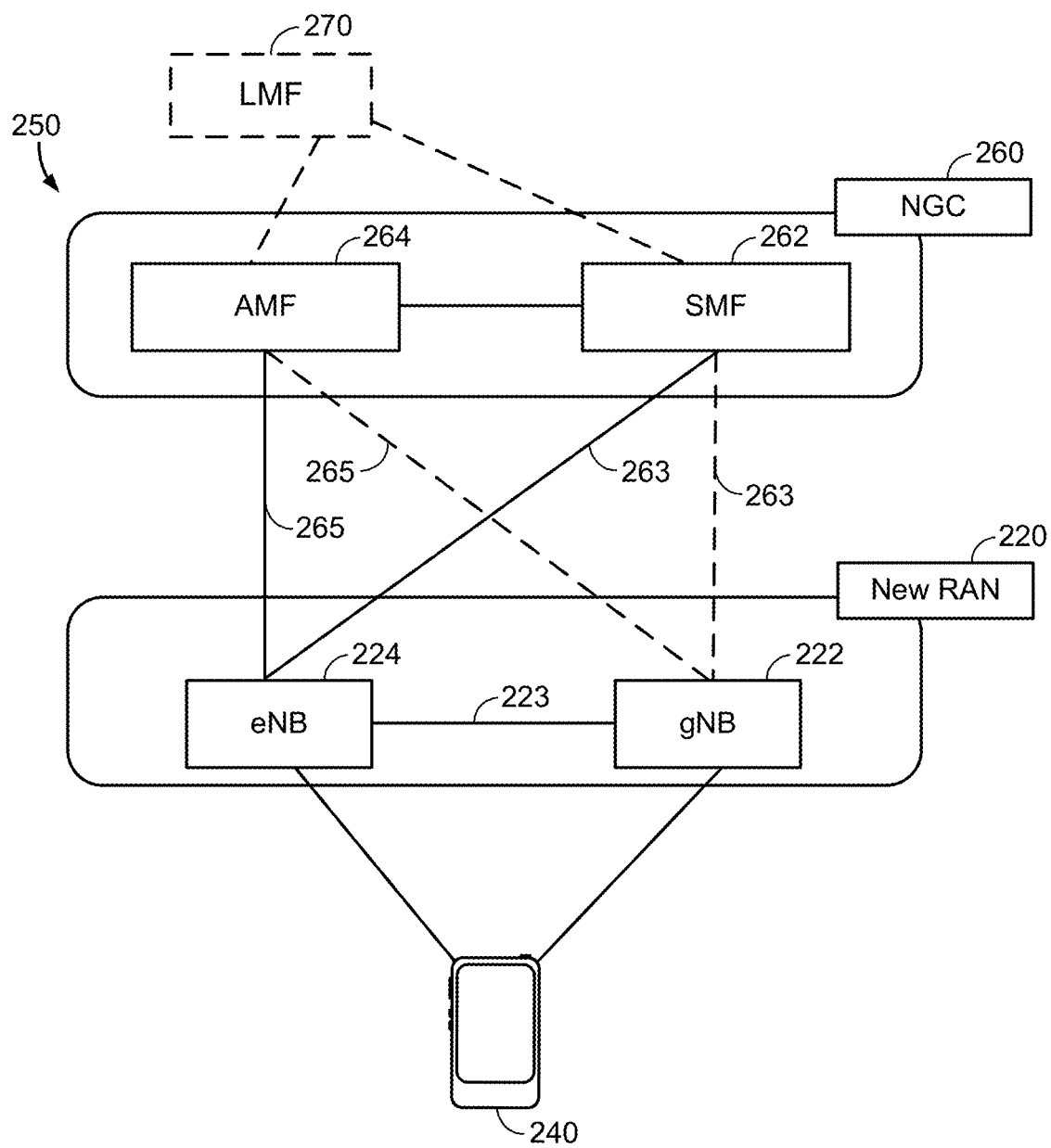

According to various aspects, FIG. 2B illustrates another example wireless network structure 250. For example, an NGC 260 can be viewed functionally as control plane functions, an access and mobility management function (AMF) 264 and user plane functions, and a session management function (SMF) 262, which operate cooperatively to form the core network. User plane interface 263 and control plane interface 265 connect the eNB 224 to the NGC 260 and specifically to AMF 264 and SMF 262. In an additional configuration, a gNB 222 may also be connected to the NGC 260 via control plane interface 265 to AMF 264 and user plane interface 263 to SMF 262. Further, eNB 224 may directly communicate with gNB 222 via the backhaul connection 223, with or without gNB direct connectivity to the NGC 260. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 182, UE 190, etc.). Another optional aspect may include a location management function (LMF) 270, which may be in communication with the NGC 260 to provide location assistance for UEs 240. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 240 that can connect to the LMF 270 via the core network, NGC 260, and/or via the Internet (not illustrated).

Figure 3A:
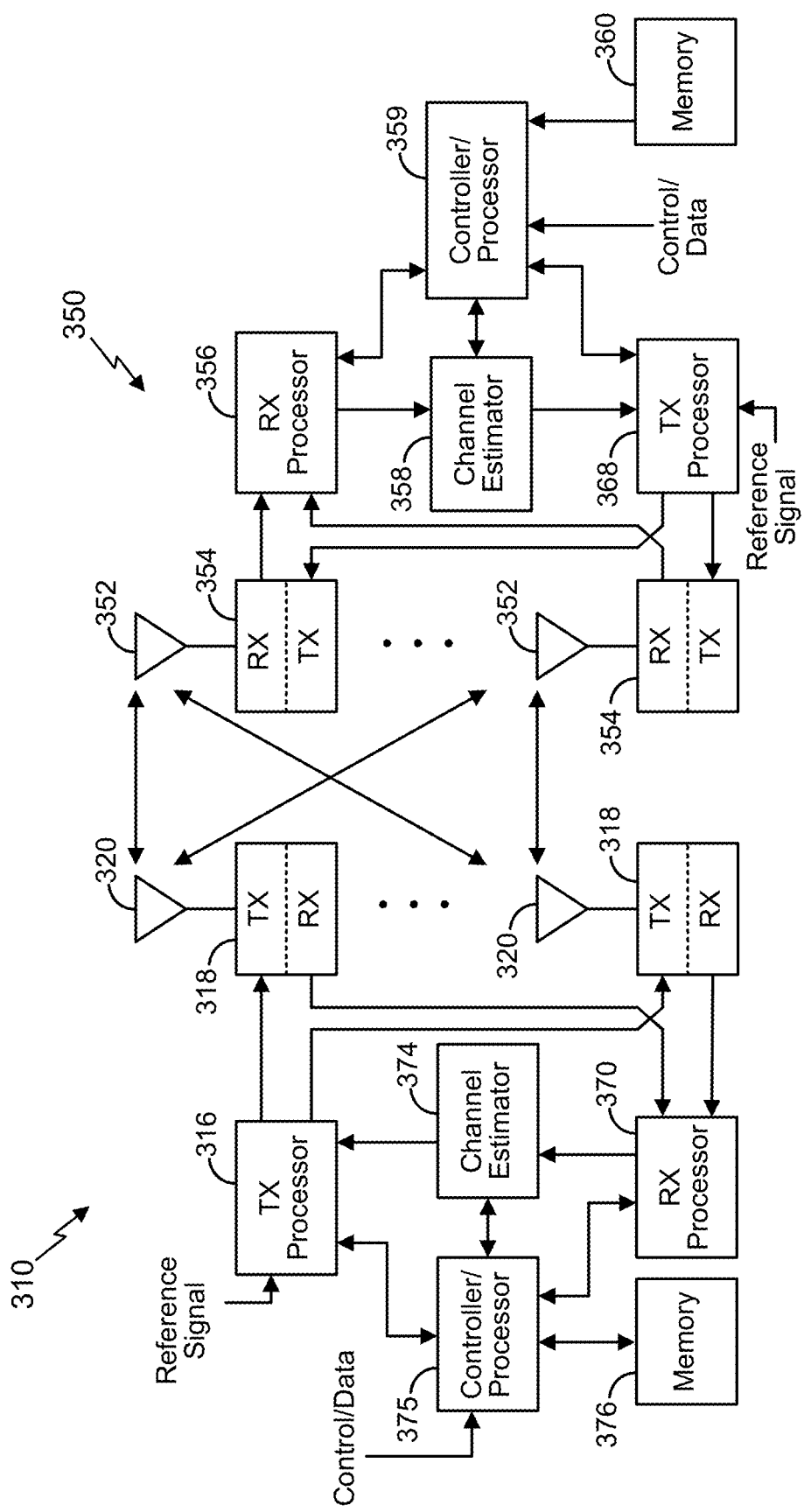
FIG. 3A illustrates an exemplary base station and an exemplary user equipment (UE) in an access network, according to various aspects.

According to various aspects, FIG. 3A illustrates an exemplary base station (BS) 310 (e.g., an eNB, a gNB, a small cell AP, a WLAN AP, etc.) in communication with an exemplary UE 350 (e.g., any of the UEs depicted in FIG. 1, such as UEs 104, UE 152, UE 182, UE 190, etc.) in a wireless network. In the DL, IP packets from the core network (NGC 210/EPC 260) may be provided to a controller/processor 375. The controller/processor 375 implements functionality for a radio resource control (RRC) layer, a packet data convergence protocol (PDCP) layer, a radio link control (RLC) layer, and a medium access control (MAC) layer. The controller/processor 375 provides RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmit (TX) processor 316 and the receive (RX) processor 370 implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency-division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to one or more different antennas 320 via a separate transmitter 318a. Each transmitter 318a may modulate an RF carrier with a respective spatial stream for transmission.

At the UE 350, each receiver 354a receives a signal through its respective antenna 352. Each receiver 354a recovers information modulated onto an RF carrier and provides the information to the RX processor 356. The TX processor 368 and the RX processor 356 implement Layer-1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and de-interleaved to recover the data and control signals that were originally transmitted by the base station 310 on the physical channel. The data and control signals are then provided to the processing system 359, which implements Layer-3 and Layer-2 functionality.

The processing system 359 can be associated with a memory 360 that stores program codes and data. The memory 360 may be referred to as a non-transitory computer-readable medium. In the UL, the processing system 359 provides demultiplexing between transport and logical channels, packet reassembly, deciphering, header decompression, and control signal processing to recover IP packets from the core network. The processing system 359 is also responsible for error detection.

Similar to the functionality described in connection with the DL transmission by the base station 310, the processing system 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354b. Each transmitter 354b may modulate an RF carrier with a respective spatial stream for transmission. In an aspect, the transmitters 354b and the receivers 354a may be one or more transceivers, one or more discrete transmitters, one or more discrete receivers, or any combination thereof.

The UL transmission is processed at the base station 310 in a manner similar to that described in connection with the receiver function at the UE 350. Each receiver 318b receives a signal through its respective antenna 320. Each receiver 318b recovers information modulated onto an RF carrier and provides the information to a RX processor 370. In an aspect, the transmitters 318a and the receivers 318b may be one or more transceivers, one or more discrete transmitters, one or more discrete receivers, or any combination thereof.

The processing system 375 can be associated with a memory 376 that stores program codes and data. The memory 376 may be referred to as a non-transitory computer-readable medium. In the UL, the processing system 375 provides demultiplexing between transport and logical channels, packet reassembly, deciphering, header decompression, control signal processing to recover IP packets from the UE 350. IP packets from the processing system 375 may be provided to the core network. The processing system 375 is also responsible for error detection.

Figure 3B:
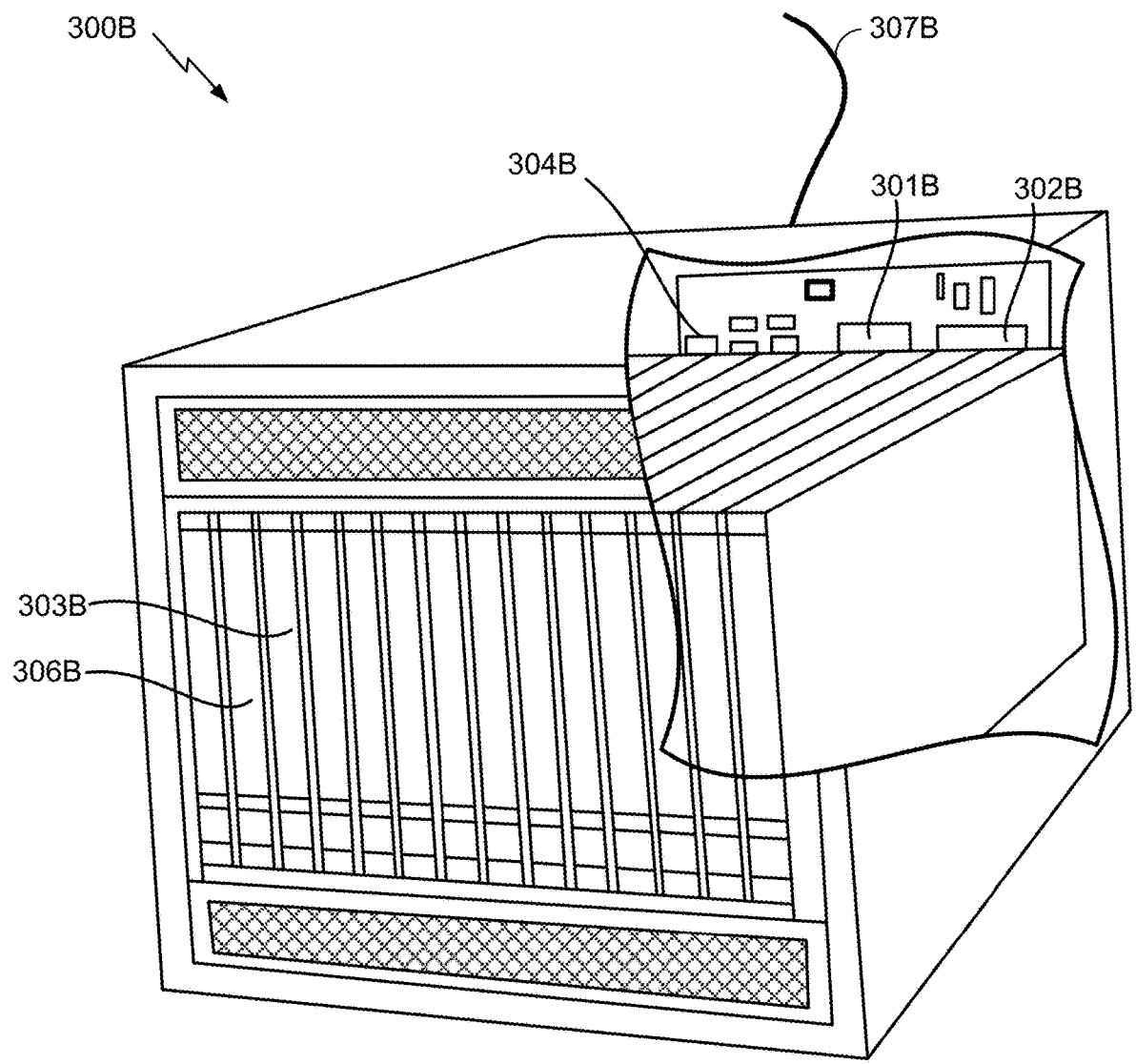
FIG. 3B illustrates an exemplary server according to various aspects.

FIG. 3B illustrates an exemplary server 300B. In an example, the server 300B may correspond to one example configuration of the location server 230 described above. In FIG. 3B, the server 300B includes a processor 301B coupled to volatile memory 302B and a large capacity nonvolatile memory, such as a disk drive 303B. The server 300B may also include a floppy disc drive, compact disc (CD) or DVD disc drive 306B coupled to the processor 301B. The server 300B may also include network access ports 304B coupled to the processor 301B for establishing data connections with a network 307B, such as a local area network coupled to other broadcast system computers and servers or to the Internet.

Figure 4:
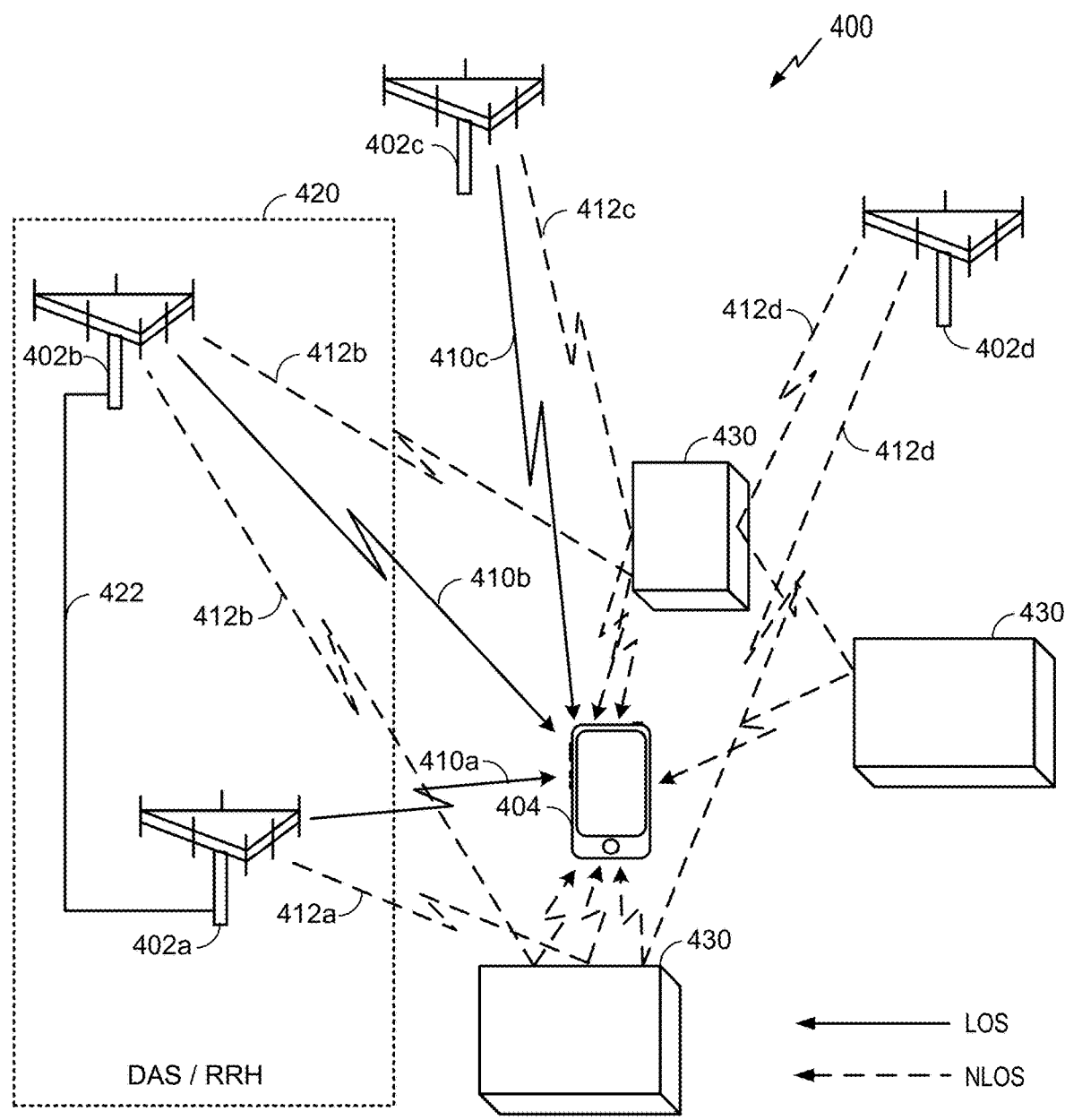
FIG. 4 illustrates an exemplary wireless communications system according to various aspects of the disclosure.

FIG. 4 illustrates an exemplary wireless communications system 400 according to various aspects of the disclosure. In the example of FIG. 4, a UE 404, which may correspond to any of the UEs described above with respect to FIG. 1 (e.g., UEs 104, UE 182, UE 190, etc.), is attempting to calculate an estimate of its position, or assist another entity (e.g., a base station or core network component, another UE, a location server, a third party application, etc.) to calculate an estimate of its position. The UE 404 may communicate wirelessly with a plurality of base stations 402a-d (collectively, base stations 402), which may correspond to any combination of base stations 102 or 180 and/or WLAN AP 150 in FIG. 1, using RF signals and standardized protocols for the modulation of the RF signals and the exchange of information packets. By extracting different types of information from the exchanged RF signals, and utilizing the layout of the wireless communications system 400 (i.e., the base stations locations, geometry, etc.), the UE 404 may determine its position, or assist in the determination of its position, in a predefined reference coordinate system. In an aspect, the UE 404 may specify its position using a two-dimensional coordinate system; however, the aspects disclosed herein are not so limited, and may also be applicable to determining positions using a three-dimensional coordinate system, if the extra dimension is desired. Additionally, while FIG. 4 illustrates one UE 404 and four base stations 402, as will be appreciated, there may be more UEs 404 and more or fewer base stations 402.

To support position estimates, the base stations 402 may be configured to broadcast reference RF signals (e.g., Positioning Reference Signals (PRS), Cell-specific Reference Signals (CRS), Channel State Information Reference Signals (CSI-RS), synchronization signals, etc.) to UEs 404 in their coverage area to enable a UE 404 to measure reference RF signal timing differences (e.g., OTDOA or RSTD) between pairs of network nodes and/or to identify the beam that best excite the LOS or shortest radio path between the UE 404 and the transmitting base stations 402. Identifying the LOS/shortest path beam(s) is of interest not only because these beams can subsequently be used for OTDOA measurements between a pair of base stations 402, but also because identifying these beams can directly provide some positioning information based on the beam direction. Moreover, these beams can subsequently be used for other position estimation methods that require precise ToA, such as round-trip time estimation based methods.

As used herein, a "network node" may be a base station 402, a cell of a base station 402, a remote radio head, an antenna of a base station 402, where the locations of the antennas of a base station 402 are distinct from the location of the base station 402 itself, or any other network entity capable of transmitting reference signals. Further, as used herein, a "node" may refer to either a network node or a UE.

A location server (e.g., location server 230) may send assistance data to the UE 404 that includes an identification of one or more neighbor cells of base stations 402 and configuration information for reference RF signals transmitted by each neighbor cell. Alternatively, the assistance data can originate directly from the base stations 402 themselves (e.g., in periodically broadcasted overhead messages, etc.). Alternatively, the UE 404 can detect neighbor cells of base stations 402 itself without the use of assistance data. The UE 404 (e.g., based in part on the assistance data, if provided) can measure and (optionally) report the OTDOA from individual network nodes and/or RSTDs between reference RF signals received from pairs of network nodes. Using these measurements and the known locations of the measured network nodes (i.e., the base station(s) 402 or antenna(s) that transmitted the reference RF signals that the UE 404 measured), the UE 404 or the location server can determine the distance between the UE 404 and the measured network nodes and thereby calculate the location of the UE 404.

The term "position estimate" is used herein to refer to an estimate of a position for a UE 404, which may be geographic (e.g., may comprise a latitude, longitude, and possibly altitude) or civic (e.g., may comprise a street address, building designation, or precise point or area within or nearby to a building or street address, such as a particular entrance to a building, a particular room or suite in a building, or a landmark such as a town square). A position estimate may also be referred to as a "location," a "position," a "fix," a "position fix," a "location fix," a "location estimate," a "fix estimate," or by some other term. The means of obtaining a location estimate may be referred to generically as "positioning," "locating," or "position fixing." A particular solution for obtaining a position estimate may be referred to as a "position solution." A particular method for obtaining a position estimate as part of a position solution may be referred to as a "position method" or as a "positioning method."

The term "base station" may refer to a single physical transmission point or to multiple physical transmission points that may or may not be co-located. For example, where the term "base station" refers to a single physical transmission point, the physical transmission point may be an antenna of the base station (e.g., base station 402) corresponding to a cell of the base station. Where the term "base station" refers to multiple co-located physical transmission points, the physical transmission points may be an array of antennas (e.g., as in a MIMO system or where the base station employs beamforming) of the base station. Where the term "base station" refers to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station). Alternatively, the non-co-located physical transmission points may be the serving base station receiving the measurement report from the UE (e.g., UE 404) and a neighbor base station whose reference RF signals the UE is measuring. Thus, FIG. 4 illustrates an aspect in which base stations 402a and 402b form a DAS/RRH 420. For example, the base station 402a may be the serving base station of the UE 404 and the base station 402b may be a neighbor base station of the UE 404. As such, the base station 402b may be the RRH of the base station 402a. The base stations 402a and 402b may communicate with each other over a wired or wireless link 422.

To accurately determine the position of the UE 404 using the OTDOAs and/or RSTDs between RF signals received from pairs of network nodes, the UE 404 needs to measure the reference RF signals received over the LOS path (or the shortest NLOS path where an LOS path is not available), between the UE 404 and a network node (e.g., base station 402, antenna). However, RF signals travel not only by the LOS/shortest path between the transmitter and receiver, but also over a number of other paths as the RF signals spread out from the transmitter and reflect off other objects such as hills, buildings, water, and the like on their way to the receiver. Thus, FIG. 4 illustrates a number of LOS paths 410 and a number of NLOS paths 412 between the base stations 402 and the UE 404. Specifically, FIG. 4 illustrates base station 402a transmitting over an LOS path 410a and an NLOS path 412a, base station 402b transmitting over an LOS path 410b and two NLOS paths 412b, base station 402c transmitting over an LOS path 410c and an NLOS path 412c, and base station 402d transmitting over two NLOS paths 412d. As illustrated in FIG. 4, each NLOS path 412 reflects off some object 430 (e.g., a building). As will be appreciated, each LOS path 410 and NLOS path 412 transmitted by a base station 402 may be transmitted by different antennas of the base station 402 (e.g., as in a MIMO system), or may be transmitted by the same antenna of a base station 402 (thereby illustrating the propagation of an RF signal). Further, as used herein, the term "LOS path" refers to the shortest path between a transmitter and receiver, and may not be an actual LOS path, but rather, the shortest NLOS path.

In an aspect, one or more of base stations 402 may be configured to use beamforming to transmit RF signals. In that case, some of the available beams may focus the transmitted RF signal along the LOS paths 410 (e.g., the beams produce highest antenna gain along the LOS paths) while other available beams may focus the transmitted RF signal along the NLOS paths 412. A beam that has high gain along a certain path and thus focuses the RF signal along that path may still have some RF signal propagating along other paths; the strength of that RF signal naturally depends on the beam gain along those other paths. An "RF signal" comprises an electromagnetic wave that transports information through the space between the transmitter and the receiver. As used herein, a transmitter may transmit a single "RF signal" or multiple "RF signals" to a receiver. However, as described further below, the receiver may receive multiple "RF signals" corresponding to each transmitted RF signal due to the propagation characteristics of RF signals through multipath channels.

Where a base station 402 uses beamforming to transmit RF signals, the beams of interest for data communication between the base station 402 and the UE 404 will be the beams carrying RF signals that arrive at UE 404 with the highest signal strength (as indicated by, e.g., the Received Signal Received Power (RSRP) or SINR in the presence of a directional interfering signal), whereas the beams of interest for position estimation will be the beams carrying RF signals that excite the shortest path or LOS path (e.g., an LOS path 410). In some frequency bands and for antenna systems typically used, these will be the same beams. However, in other frequency bands, such as mmW, where typically a large number of antenna elements can be used to create narrow transmit beams, they may not be the same beam.

While FIG. 4 is described in terms of transmissions from a base station to a UE, it will be appreciated that the downlink RF signal paths described with respect to FIG. 4 are equally applicable to transmissions from a UE to a base station where the UE is capable of MIMO operation and/or beamforming. Also, while beamforming is generally described above in context with transmit beamforming, receive beamforming may also be used in conjunction with the above-noted transmit beamforming in certain embodiments.

OTDOA is a downlink positioning methodology introduced in LTE Rel. 9. OTDOA is a multilateration methodology in which a UE measures the time of arrival (TOA) of signals received from multiple base stations (or eNodeBs). The TOAs of Cell-specific Reference Signals (CRSs) from several neighboring base stations or cells (e.g., eNodeBs) are subtracted from a TOA of a Positioning Reference Signal (PRS) of a reference base station or cell (e.g., eNodeB) to form OTDOAs. In an example, PRSs may be periodically transmitted by base stations or cells (e.g., during positioning occasions that occur aperiodically or at a certain periodicity or interval) and may be implemented as pseudo-random Quadrature Phase Shift Keying (QPSK) sequences that are mapped in diagonal patterns with shifts in frequency and time to avoid collision with cell-specific reference signals. Geometrically, each time (or range) difference determines a hyperbola, and the point at which these hyperbolas intersect is the estimated UE location.

The measurement made by the UE for OTDOA positioning is the Reference Signal Time Difference (RSTD) measurement. The RSTD is the relative timing difference between two cells; namely, the reference cell and a measured neighboring cell. The RSTD measurement is possible on an intra-frequency cell and on an inter-frequency cell. The OTDOA-based may also be implemented in the uplink direction, which is referred to as uplink TDOA (U-TDOA).

In certain legacy LTE standards, the PRSs are transmitted on 'dedicated' uplink and/or downlink resources which are not frequency division multiplexed (FDMed) with any other channels or signals. While refraining from FDMing and/or puncturing these PRS-dedicated resources may improve measurement accuracy somewhat, it is possible for certain signals to have a higher-priority than the PRSs for which the resources are dedicated from time to time. Accordingly, embodiments of the disclosure are directed to selectively puncturing at least part of a set of resources allocated to uplink and/or downlink PRS transmission, whereby a non-punctured subset of the set of resources can be used for the scheduled PRS transmission, while a punctured subset of the set of resources can be used for another purpose (e.g., to facilitate an intra-cell or neighbor cell transmission of one or more signals having a higher-priority than the punctured PRS transmission). The embodiments described below may be deployed with respect to a modified version of LTE, a 5G or NR wireless communications system, or some other wireless communications system.

Figure 5:
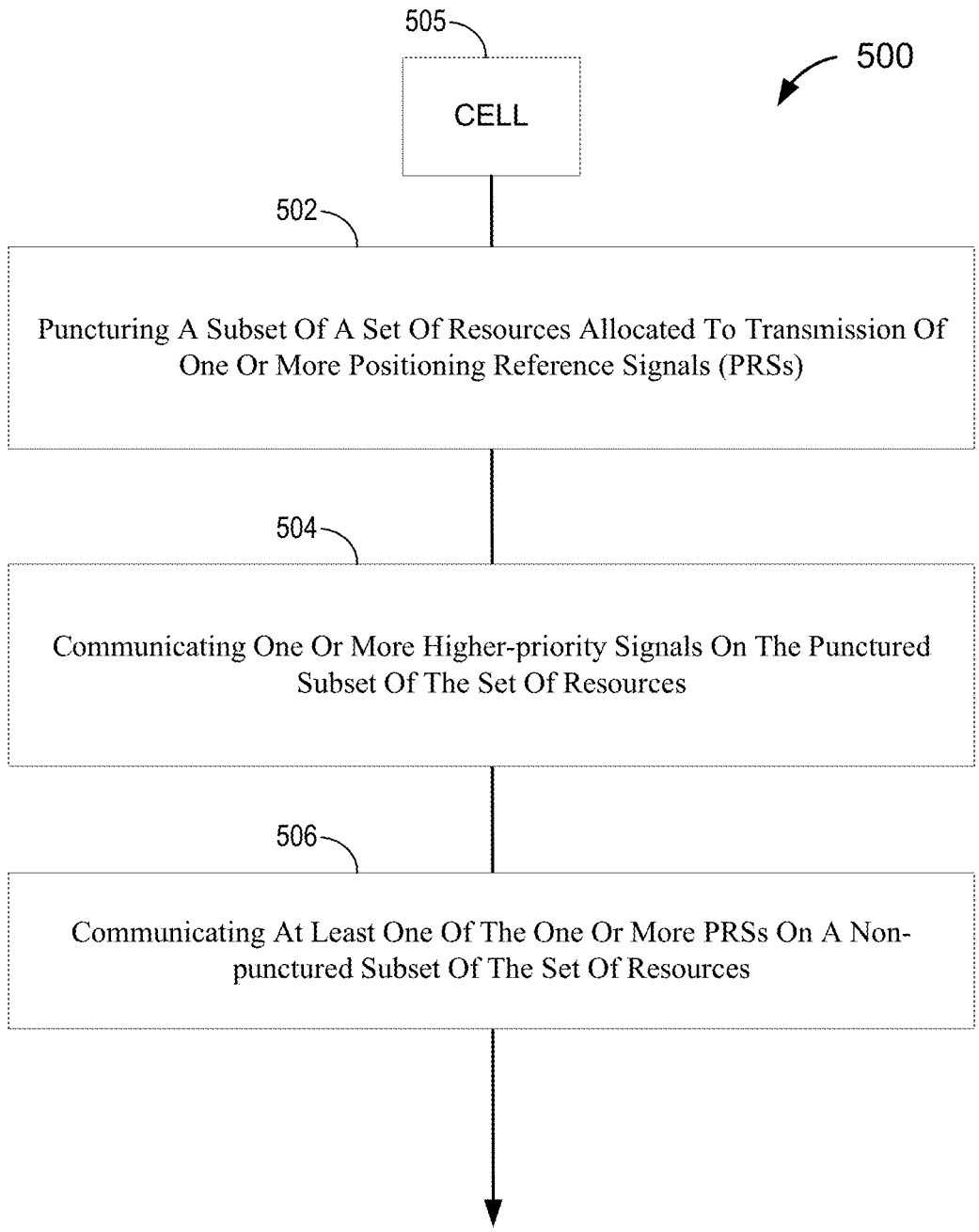
FIG. 5 illustrates an exemplary process of puncturing resource(s) allocated to a positioning reference signal (PRS) according to an aspect of the disclosure.

FIG. 5 illustrates an exemplary process 500 of puncturing resource(s) allocated to a PRS according to an aspect of the disclosure. The process 500 of FIG. 5 is performed by a cell 505. In an example, the cell 505 may correspond to a base station (e.g., gNB 222, eNB 224, base station 310, etc.).

At 502, the cell 505 (e.g., controller/processor 375, processor 301B, etc.) punctures a subset of a set of resources allocated to transmission of one or more PRSs. In the embodiment of FIG. 5, the puncturing of the set of resources is performed so as to repurpose the punctured subset of the set of resources for transmission of one or more higher-priority signals in an intra-cell manner. In context, the higher-priority signals can correspond to any signal type (e.g., LTE CRS, LTE PRS, ULRRC, etc.) that has a higher absolute priority or a higher contextual priority (e.g., a relative priority that can change over time or in different situations) relative to the one or more PRSs whose resources are being punctured. In other words, the one or more PRSs at 502 are between the cell 505 and at least one UE, and the one or more higher-priority signals are likewise between that same cell 505 and at least one UE. At 504, the cell 505 (e.g., antenna(s) 320, transmitter(s) 318, and/or TX processor 316) communicates one or more higher-priority signals on the punctured subset of the set of resources. At 506, the cell 505 (e.g., antenna(s) 320, transmitter(s) 318, and/or TX processor 316) communicates at least one of the one or more PRSs on a non-punctured subset of the set of resources (e.g., in the same manner as if the puncturing of 502 was not performed).

Referring to FIG. 5, the communicating that occurs at block 504 or block 506 may correspond to an uplink communication from one or more UEs to the cell 505 (e.g., a receive operation from the cell 505 perspective) or to a downlink communication from the cell 505 one or more UEs (e.g., a transmit operation from the cell 505 perspective). In this case, the communication as used herein refers to a one-way communication. However, it is possible for the set of resources to be punctured multiple times (some for downlink communications and some for uplink communications). So, two or more instances of the process of FIG. 5 can execute in parallel with respect to the same set of resources, with block 504 for each instance mapping to downlink communications, uplink communications or a mixture thereof across the instances.

Referring to FIG. 5, in an example, the puncturing of 502 may be implemented so as to puncture the set of resources in accordance with a threshold puncture ratio between the punctured subset of resources and the total set of resources (or equivalently, between the punctured subset and the non-punctured subset of resources). In this case, the cell 505 refrains from puncturing the one or more PRSs beyond the threshold puncture ratio (e.g., to preserve some threshold quality level for positioning).

Still referring to FIG. 5, in another example, the puncturing of 502 may be implemented so as to puncture the set of resources in accordance with a threshold bandwidth for the non-punctured subset of resources. In this case, the cell 505 refrains from puncturing the one or more PRSs beyond the threshold bandwidth (e.g., to preserve some threshold quality level for positioning).

Still referring to FIG. 5, in another example, the puncturing of 502 may be implemented in accordance with a puncture pattern (i.e., non-random). In some implementations, the puncture pattern may comprise puncturing of contiguous resource block (RB) puncturing of the PRS RBs, which may cause less of an impact to the quality of a positioning procedure compared to scattering the punctured RBs across a slot. In one example, if the non-punctured subset of the set of resources includes two separate sets of RBs, each being a frequency-contiguous set of RBs, the UE may process these contiguous RB sets separately. If puncturing occurs at a contiguous set of RBs at the edge of the PRS bandwidth, the remaining non-punctured RBs form a single contiguous set of RBs to be processed by the UE. This example may be further extended to a case with N separate subsets of contiguous RBs after puncturing, and further the UE may indicate capabilities relating to the maximum permissible value of N and the number of subsets that the UE can process (note that it may not process all N subsets). In another example, the puncture pattern may comprise puncturing on particular component carriers (CCs) while leaving other CC(s) non-punctured. Alternatively, all the PRS in all the CC may be treated as if they belong to a single larger CC for the purpose of applying the puncturing rules.

Still referring to FIG. 5, in another example, a slot format indication (SFI) may be used to indicate the direction (e.g., DL, UL or flexible) of OFDM symbols in a particular slot. Flexible OFDM symbols may then be set to DL or UL based on a dynamic DCI. Rules may be adapted to handle direction (e.g., UL/DL) conflicts. One example of such a rule is that a dynamic indication of UL/DL can override a previous semi-static indication, but two conflicting dynamic indications may be interpreted as an error event (e.g., UE behavior undefined, as the UE is being given conflicting information as to whether particular resources are for UL or DL). These rules may further be extended to handle PRS puncturing, with non-limiting examples as follows:

DL PRS only permitted on DL or flexible OFDM symbols, or

UL PRS only permitted on UL or flexible OFDM symbols, or

Semi-statically configured DL PRS on flexible symbols causes flexible symbols to be treated as DL, or Semi-statically configured UL PRS on flexible symbols causes flexible symbols to be treated as UL PRS puncturing as described earlier only allowed on flexible OFDM symbols. Puncturing may be allowed or disallowed if semi-static slot format configuration is not received.

Still referring to FIG. 5, in another example, the puncturing of 502 may be based in part upon whether the one or more PRSs and/or the one or more higher-priority signals are transmitted aperiodically or periodically. In one implementation, the puncturing of 502 may be performed only for periodic PRSs (e.g., whereby a puncture pattern can be conveyed to the UE in advance via a semi-persistent protocol, etc.). For example, periodic puncturing may be indicated and/or activated via an RRC message, a medium access control (MAC) command element (CE), and/or downlink control information (DCI) (e.g., similar to a semi-persistent Channel State Information RS (CSI-RS) in LTE). In another example, resource block (RB) or resource element (RE)-level physical downlink shared channel (PDSCH) puncturing can be used to indicate puncturing of PRS. In a further example, aperiodic puncturing can be indicated by DCI scrambled with an Interrupt Radio Network Temporary Identifier (INT-RNTI).

Still referring to FIG. 5, in another example, the puncturing of 502 may be implemented based on UE capability information and/or a UE configuration of one or more UEs served by the cell 505. For example, at least one UE may report to the cell 505 degree to which PRS puncturing can be tolerated by the at least one UE. For example, the UE-indicated degree can depend on a configuration of E-UTRAN New Radio—Dual Connectivity (EN-DC) for the at least one UE, an indication of a Carrier Aggregation (CA) capability or configuration for the at least one UE, and so on. For example, UEs configured to operate in accordance with EN-DC or with CA may be able to tolerate more PRS puncturing, such that the indicated degree can be interpreted as being higher for such UEs, and lower for UEs that lack such a capability or configuration. The cell 505 can then limit a degree of puncturing at 502 to which the set of resources is punctured to the UE-indicated degree. For example, the puncturing of 502 may allow puncturing for PRS resources for UEs operating in accordance with NR with EN-DC provided that PRS is configured in LTE.

Still referring to FIG. 5, in another example, the puncturing of 502 may be based on a PRS type of the one or more PRSs. In one example, the PRS type is one of unicast, broadcast, or multicast. For example, the puncturing at 502 for broadcast/multicast PRSs may be restricted relative the puncturing at 502 for unicast PRSs (e.g., since more UEs are impacted by broadcast/multicast-specific puncturing relative to unicast-specific puncturing). In one particular example, the puncturing restriction for the one or more broadcast/multicast PRSs is characterized by a first set of signals (e.g., higher-priority signals LTE CRS or LTE PRS, etc.) such as being permitted to puncture the one or more broadcast/multicast PRSs and a second set of signals (e.g., lower-priority signals such as URLLC, etc.) not being permitted to puncture the one or more broadcast/multicast PRSs. In this case, the channel carrying the first set of signals is deemed to have a higher-priority than the PRS(s) that would otherwise be transmitted upon the punctured subset of resources.

Still referring to FIG. 5, in another example, the puncturing of 502 may be based on whether the PRS type for the one or more PRSs to be punctured is uplink or downlink. In one example, the puncturing of 502 is only performed for downlink PRS(s), and no puncturing is performed with respect to uplink PRS(s). In another example, the puncturing of 502 is restricted for one or more uplink PRSs and is unrestricted for one or more downlink PRSs. In one particular example, the puncturing restriction for the one or more uplink PRSs is characterized by only whole symbol puncturing being authorized for the one or more uplink PRSs (e.g., to reduce or avoid phase-discontinuities).

Still referring to FIG. 5, in another example, the cell 505 may optionally notify one or more UEs of the puncturing at 502. For example, the optional UE notification(s) may be sent to indicate that the puncturing at 502 will be performed periodically (e.g., so that each instance of periodic puncturing need not require its own separate notification). In another example, the optional UE notification(s) may be sent selectively to UE(s) involved in the exchanging that occurs at either 504 or 506.

Still referring to FIG. 5, in another example, assume that the one or more PRSs correspond to one or more downlink PRSs and the one or more higher-priority signals correspond to one or more uplink transmissions by at least one UE to the cell 505. In this case, the optional UE notification(s) may be transmitted by the cell 505 to the at least one UE as instruction(s) to transmit the one or more higher-priority signals on the punctured subset of resources instead of decoding the one or more downlink PRSs. Alternatively, assume that the one or more PRSs correspond to one or more uplink PRSs and the one or more higher-priority signals correspond to one or more downlink transmissions. In this case, the optional UE notification(s) may be transmitted by the cell 505 to the at least one UE as instruction(s) to decode the one or more higher-priority signals on the punctured subset of resources instead of transmitting the one or more uplink PRSs. Accordingly, the optional UE notification(s) can be sent so as to swap the UE between uplink and downlink operation with respect to the punctured subset of resources. The notification may be sent in the form of a semi-static or dynamic SFI indication. The puncturing in this case may correspond to a whole OFDM symbol puncturing, so that simultaneous transmission on both links (UL and DL) does not occur on any OFDM symbol.

Puncturing has described above to refer to replacing of parts (e.g., certain REs or RBs) of PRS waveform by alternative waveforms in an intra-cell manner. However, note that transmission of PRS in one cell may correspond to silence (i.e., no transmissions) on the same time-frequency resources in neighboring cell(s), so as to reduce the inter-cell interference experienced by the PRS. The puncturing may also apply to these silence periods, i.e., a waveform may be allowed to be transmitted on these silence periods even though it causes interference to the neighboring cell PRS, because it is deemed to have higher priority than the PRS. This behavior may be transparent to the UE, as the UE may not be aware of the silence periods, i.e., the silence periods are enforced, and overridden when necessary, purely through appropriate scheduling of the UE by the gNB. Alternatively, UE may be informed of the silence periods, for example, to allow the UE to disable some of its processing functions based on the silences (e.g., go into a sleep-mode, reduce PDCCH candidate searches, etc.), in which case, the UE may have to be informed explicitly about any overrides of these silence periods. This applies to both UL and DL PRS. Opportunistic inter-cell transmissions during the above-noted silence periods for PRS are discussed in more detail below with respect to FIGS. 8-11.

Figure 6:
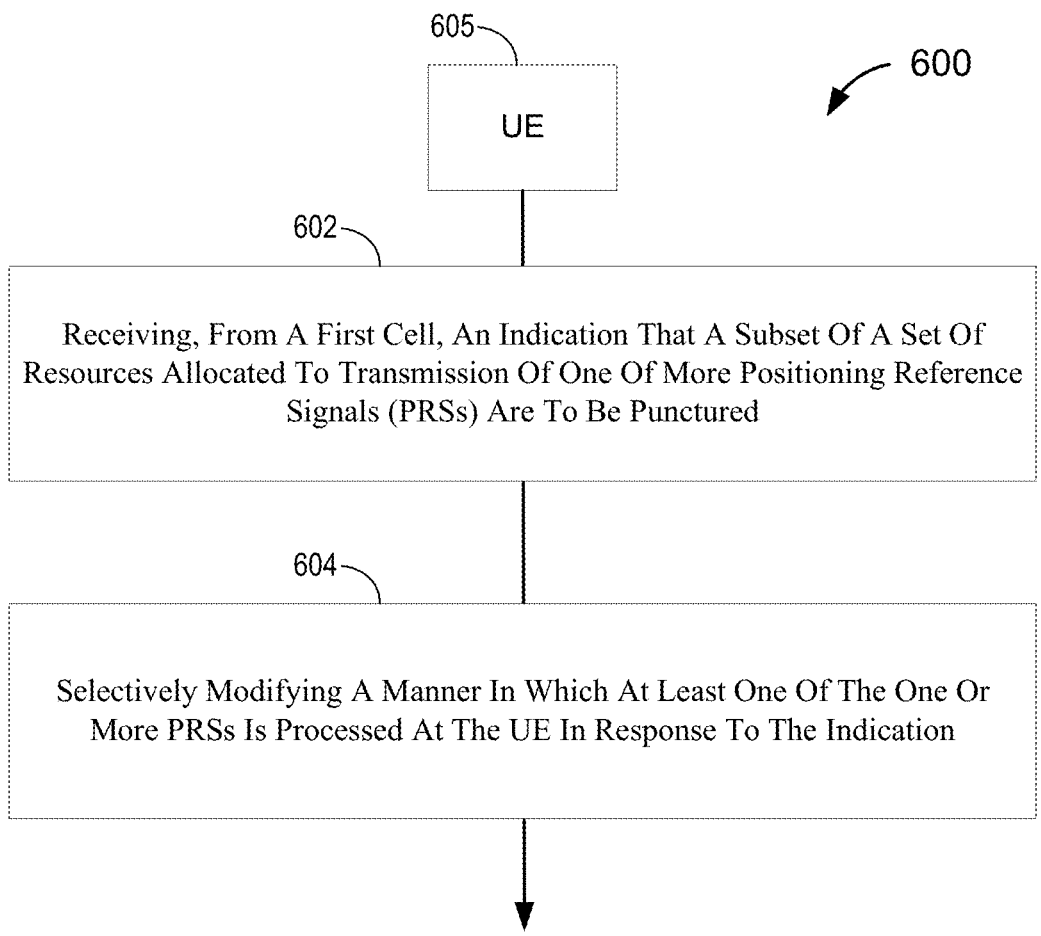
FIG. 6 illustrates an exemplary process of modifying PRS-related processing at a UE according to an aspect of the disclosure.

FIG. 6 illustrates an exemplary process 600 of modifying PRS-related processing at a UE according to an aspect of the disclosure. The process 600 of FIG. 6 is performed by a UE 605, which may correspond to any of the above-noted UEs (e.g., UE 240, 350, etc.).

At 602, the UE 605 (e.g., antenna(s) 352, receiver(s) 354, and/or RX processor 356) receives, from a first cell (e.g., cell 505), an indication that a subset of a set of resources allocated to transmission of one or more PRSs are to be punctured. At 604, the UE 605 selectively modifies (e.g., controller/processor 359, etc.) a manner in which at least one of the one or more PRSs is processed at the UE in response to the indication.

Referring to FIG. 6, in an example, the indication received at 602 may correspond to the optional UE notification discussed above with respect to FIG. 5.

Referring to FIG. 6, in another example, assume that the indication indicates a punctured subset of the set of resources corresponds to uplink resources. In one example under this assumption, the selectively modifying at 604 may comprise modifying a manner in which the at least one PRS is transmitted by the UE on the punctured subset of resources. In one example, the UE may opt not to modify its uplink PRS transmission(s) and may instead simply ignore the indication of 602. In another example, the UE 605 selectively modifies the handling of the at least one PRS by transmitting one or more higher-priority signals (e.g., LTE CRS, LTE PRS, URLLC, etc.) on the punctured subset of resources instead of transmitting the at least one PRS on the punctured subset of resources.

Referring to FIG. 6, in another example, assume that the indication indicates a punctured subset of the set of resources corresponds to downlink resources. In one example under this assumption, the selectively modifying at 604 may comprise modifying a manner in which the at least one PRS is measured at the UE, how at least one measurement of the at least one PRS is reported by the UE, and/or how the at least one measurement of the at least one PRS is used in a positioning algorithm at the UE. For example, the UE 605 may interpolate punctured tone(s) using neighboring tone(s), may view a punctured PRS as multiple non-punctured PRSs with a smaller time frequency occupancy, and/or may deprioritize punctured over non-punctured PRSs in reporting and/or in UE-based positioning algorithm. Alternatively, the UE 605 may ignore the indication instead of modifying a manner in which the at least one PRS is processed by the UE. The behavior followed by the UE may be indicated by or may depend on the indicated UE capabilities to the serving cell.

Referring to FIG. 6, in another example, assume that the UE 605 communicates part of the one or more PRSs between the UE 605 and a first cell on a non-punctured subset of the set of resources. In one example under this assumption, the selectively modifying at 604 may communicate (e.g., on uplink or downlink) one or more higher-priority signals with the first cell on a punctured subset of the set of resources. In another example, if the punctured subset of the set of resources corresponds to uplink resources, the UE 605 may modify its transmission of the at least one PRS as noted above. By contrast, if the punctured subset of the set of resources corresponds to downlink resources, the UE 605 may modify its reception and/or processing of the at least one PRS as noted above. As will be described in more detail below with respect to FIG. 9, if the at least one PRS being punctured is an uplink PRS, the UE 605 may cease transmission of the at least one PRS on the punctured subset of resources without transmitting anything in its place (e.g., to accommodate a transmission from another entity, such as a neighboring-cell PRS).

Figure 7:
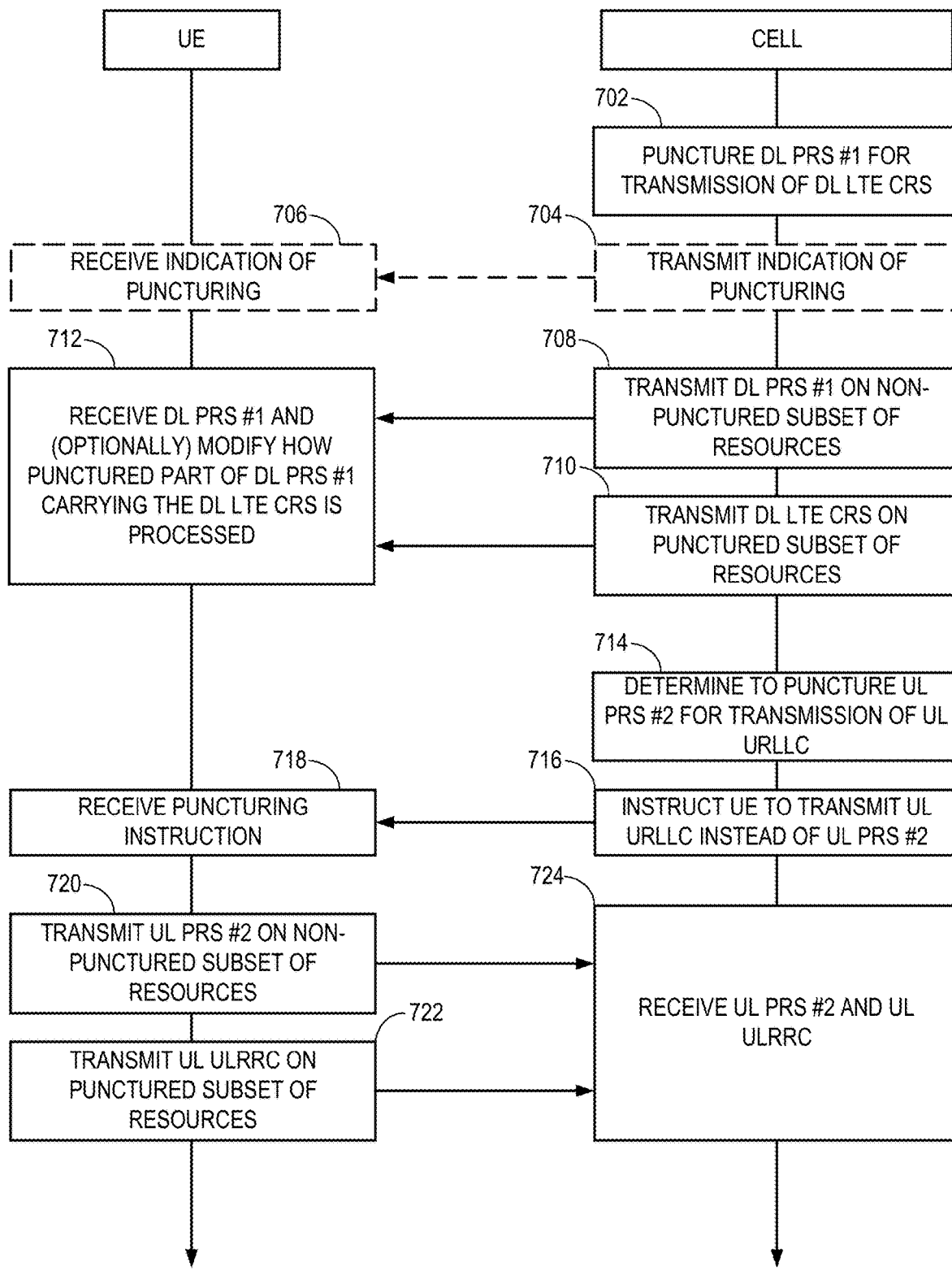
FIG. 7 illustrates an example implementation of the processes of FIGS. 5-6 in accordance with an embodiment of the disclosure.

FIG. 7 illustrates an example implementation of the processes of 500-600 of FIGS. 5-6 in accordance with an embodiment of the disclosure.

At 702 (e.g., as in 502 of FIG. 5), a cell (e.g., cell 505) punctures a resource(s) allocated to a downlink PRS ("DL PRS #1") for transmission of a DL LTE CRS. DL PRS #1 may be either periodic or aperiodic, and is targeted to a UE (and possibly other UEs if DL PRS #1 is multicast/broadcast). As will be appreciated, DL PRS #1 could also be punctured so the cell could perform a downlink transmission to some other UE in an alternative embodiment. At 704-706 (e.g., as in 602 of FIG. 6), the cell optionally notifies the UE of the puncturing. In an example, the notification at 704-706 could be arranged to apply to multiple periodic instances of DL PRS #1 in other embodiments. At 708-710 (e.g., as in 504-506 of FIG. 5), the cell transmits DL PRS #1 on the non-punctured subset of resources and transmits DL LTE CRS on the punctured subset of resources. At 712, the UE receives DL PRS #1 on the non-punctured subset of resources and optionally modifies its processing of the DL LTE CRS on the punctured subset of resources (e.g., ignore the optional indication and treat as if the DL LTE CRS were part of DL PRS #1, deprioritize some part of DL PRS #1 that includes the punctured subset of resources, etc.).

At 714 (e.g., as in 502 of FIG. 5), a cell (e.g., cell 505) determines to puncture a resource(s) allocated to an uplink PRS ("UL PRS #2") by the UE for transmission of a UL ULRRC waveform by that same UE. As will be appreciated, UL PRS #2 could also be punctured so that some other UE could perform an uplink transmission in an alternative embodiment. UL PRS #2 may be either periodic or aperiodic. At 716-718 (e.g., as in 602 of FIG. 6), the cell notifies the UE of the puncturing via an instruction for the UE to transmit the UL URLLC waveform instead of UL PRS #2. In an example, the instruction at 716-718 could be arranged to apply to multiple periodic instances of UL PRS #2 in other embodiments. At 720-722 (e.g., as in 504-506 of FIG. 5), the UE transmits UL PRS #2 on the non-punctured subset of resources and transmits UL ULRRC on the punctured subset of resources. At 724, the cell receives UL PRS #2 and UL ULRRC.

While the embodiment of FIG. 7 provides examples where a UL-allocated resource is punctured to accommodate a UL transmission and a DL-allocated resource is punctured to accommodate a DL transmission, in other embodiments the communication direction can be swapped via the puncturing. In this case, a UL-allocated resource may be punctured to accommodate a DL transmission, or a DL-allocated resource may be punctured to accommodate a UL transmission While the embodiments of FIGS. 5-7 are generally described above with respect to intra-cell puncturing, it is also possible for PRS puncturing to be performed on a first cell to accommodate (i.e., reduce interference upon) a UL or DL transmission associated with a second cell. For certain higher-priority signals (e.g., signals deemed to be of higher priority than a PRS on targeted resource(s) to be punctured), the second cell may even attempt to transmit these higher-priority signals in the absence of such puncturing by the first cell (i.e., with the knowledge that interference upon a UL or DL PRS at the first cell is possible). These embodiments are described in more detail below with respect to FIGS. 8-11.

Figure 8:
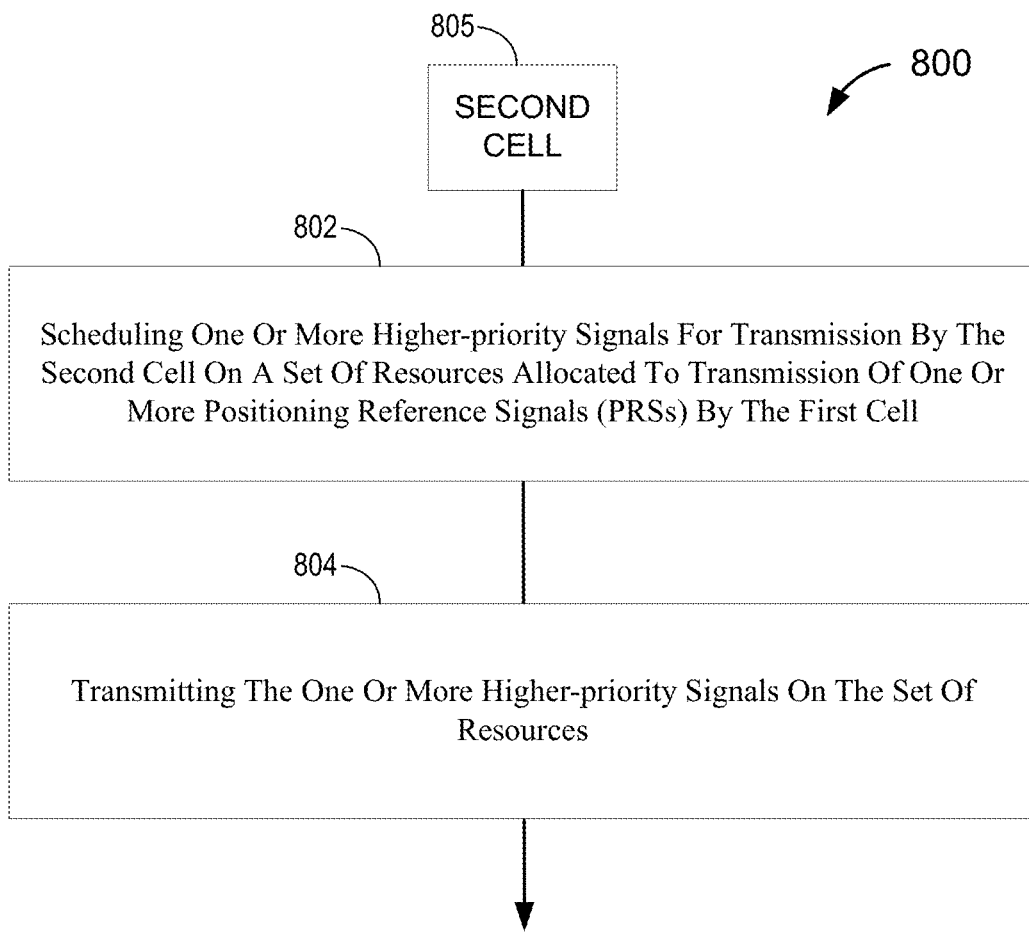
FIG. 8 illustrates an exemplary process of transmitting signals on a second cell according to an aspect of the disclosure.

FIG. 8 illustrates an exemplary process 800 of transmitting signals on a second cell according to an aspect of the disclosure. The process 800 of FIG. 8 is performed by a second cell 805, which is distinct from a first cell 905 as described below with respect to FIG. 9. More specifically, the first cell 905 and the second cell 805 are neighbor cells, whereby a wireless transmission from either cell has the potential to interfere with a wireless transmission on the other cell if transmitted upon the same resources. In an example, the second cell 805 may correspond to a base station (e.g., gNB 222, eNB 224, base station 310, etc.).

Referring to FIG. 8, at 802, the second cell 805 (e.g., controller/processor 375, processor 301B, etc.) schedules one or more higher-priority signals (e.g., UL or DL signals) for transmission by the second cell on a set of resources allocated to transmission of one or more PRSs (e.g., UL or DL PRSs) by the first cell. At 804, the second cell 805 (e.g., antenna(s) 320, transmitter(s) 318, and/or TX processor 316) transmits the one or more higher-priority signals on the set of resources. The transmission at 804 does not occur under certain legacy LTE standards, as network coordination would conventionally occur to ensure that the second cell 805 does not transmit upon the set of resources allocated to transmission of PRSs by the first cell so as to reduce inter-cell interference upon the one or more PRSs.

Referring to FIG. 8, in an example, the second cell 805 may optionally transmit an indication of the scheduling to the first cell 905 to facilitate the first cell 905 to puncture transmission of the one or more PRSs on the set of resources. This indication may specify the particular resource(s) on which the higher-priority signal(s) have been scheduled by the second cell 805 to facilitate the first cell 905 to puncture those same resource(s). However, this indication need not be sent or could be lost in transmission, in which case the transmission at 804 could theoretically occur in a manner that causes interference to the PRS(s) at the first cell. In an example, the one or more higher-priority signals may include an LTE CRS, an LTE PRS, a ULRRC, or a combination thereof.

Referring to FIG. 8, the decision at the second cell 805 to schedule and transmit the signals at 802-804 may be based upon a comparison of a priority of the signals to be transmitted to the priority of the corresponding PRS(s) at the first cell 905 that would be impacted (e.g., punctured or interfered with) by such signals. In this context, a "higher-priority" signal may correspond to any signal having a higher priority that the corresponding PRS(s) based on such a comparison. As noted above, the relative priorities between the first cell's PRS(s) (e.g., NR/5G PRSs) and other signal types (e.g., UL or DL LTE PRS/CRS by the first or second cell, UL or DL ULRRC by the first or second cell, etc.) can be absolute such that certain signal types always have higher priority than the first cell's PRS(s), the relative priority can also be conditional or contextual in other embodiments. For example, assume that the first cell's PRS(s) are broadcast PRSs. In this case, the priority of these broadcast PRSs may scale with the number of UEs being served by the first cell, as more UEs are impacted by any puncturing performed on the associated PRS resources of the first cell. Accordingly, a signal that is higher-priority than one particular punctured PRS may not necessarily have a higher priority than the first cell's PRS at other times and/or under other conditions.

Figure 9:
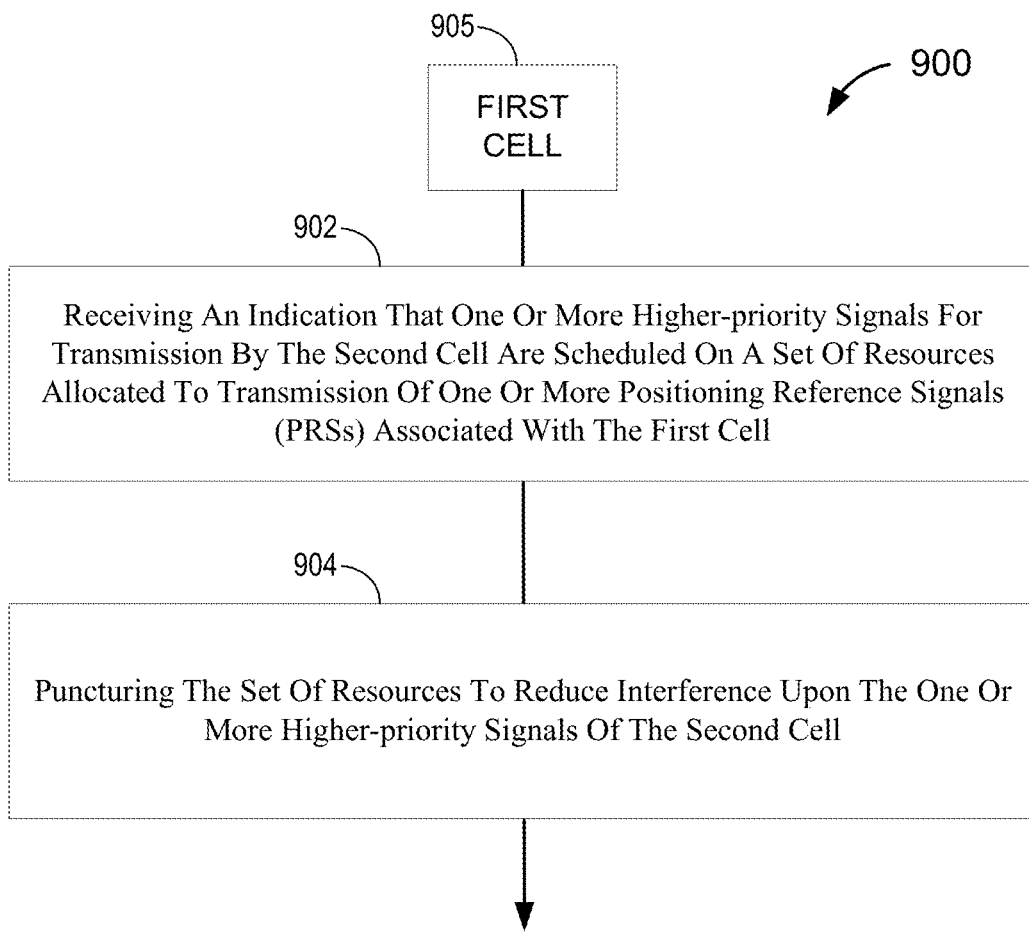
FIG. 9 illustrates an exemplary process of puncturing resource(s) allocated to a PRS according to another aspect of the disclosure.

FIG. 9 illustrates an exemplary process 900 of puncturing resource(s) allocated to a PRS according to another aspect of the disclosure. The process 900 of FIG. 9 is performed by the first cell 905, which is distinct from the second cell 805 of FIG. 8 as described above. More specifically, the first cell 905 and the second cell 805 are neighbor cells, whereby a wireless transmission from either cell has the potential to interfere with a wireless transmission on the other cell if transmitted upon the same resources. In an example, the first cell 905 may correspond to a base station (e.g., gNB 222, eNB 224, base station 310, etc.).

Referring to FIG. 9, at 902, the first cell 905 (e.g., TX processor 316, transmitter(s) 318, antenna(s) 320, etc.) receives an indication that one or more higher-priority signals (e.g., UL or DL signals) for transmission by the second cell are scheduled on a set of resources allocated to transmission of one or more PRSs (e.g., UL or DL PRSs) associated with the first cell. In an example, the indication received at 902 may correspond to the optional indication discussed above with respect to FIG. 8. At 904, the first cell 905 (e.g., controller/processor 375, processor 301B, etc.) punctures the set of resources to reduce interference upon the one or more higher-priority signals of the second cell. In an example, the indication at 902 may specify the particular resource(s) on which the higher-priority signal(s) have been scheduled by the second cell 805 to facilitate the first cell 905 to puncture those same resource(s) at 904 (e.g., at least, to the extent that PRS puncturing is permitted subject to other factors such a target puncture ratio or bandwidth, etc., as discussed above with respect to 502 of FIG. 5).

Generally, while the purpose of the puncturing at 904 of FIG. 9 is to facilitate an external cell (or inter-cell) transmission whereas the puncturing at 502 of FIG. 5 is to facilitate another transmission from the same cell (intra-cell transmission), the mechanisms by which the puncturing is implemented at 502 and 904 may be similar or identical (e.g., via the use of a target puncture pattern, a threshold bandwidth, etc.). The examples discussed above with respect to 502 of FIG. 5 are thereby incorporated by reference with respect to 904 of FIG. 9, and will not be discussed further at this point for the sake of brevity. However, it will be appreciated that the puncturing at 502 of FIG. 5 and 904 of FIG. 9 could also be implemented via different mechanisms (e.g., different parameter considerations or parameter values) in other embodiments of the disclosure.

Referring to FIG. 9, similar to 504 of FIG. 5, the puncturing of 904 may result a punctured subset of the set of resources that corresponds to uplink resources (e.g., resources that were allocated to UL PRS(s)). In this case, in an example, the puncturing of 904 may include transmitting an instruction to at least one UE to modify transmission of at least one of the one or more PRSs on the punctured subset of resources (e.g., lowering a transmission power or stopping transmission of the UL PRS(s) on the punctured subset of resources altogether to avoid interfering with the higher-priority signals of the second cell). In a further example, this indication may correspond to the indication discussed above with respect to 602 of FIG. 6.

Referring to FIG. 9, similar to 504 of FIG. 5, the puncturing of 904 may result in a punctured subset of the set of resources that corresponds to downlink resources (e.g., resources that were allocated to DL PRS(s)). In this case, in an example, the puncturing of 904 may include modifying transmission of at least one of the one or more PRSs by the first cell to UE on the punctured subset of resources (e.g., lowering a transmission power or stopping transmission of the DL PRS(s) on the punctured subset of resources altogether to avoid interfering with the higher-priority signals of the second cell).

Referring to FIG. 9, the first cell 905 may optionally transmit an indication of the puncturing of 904 to at least one UE. This indication may correspond to the indication described above with respect to 602, in an example. Alternatively, the first cell 905 need not notify the at least one UE of the puncturing of 904.

Figure 10:
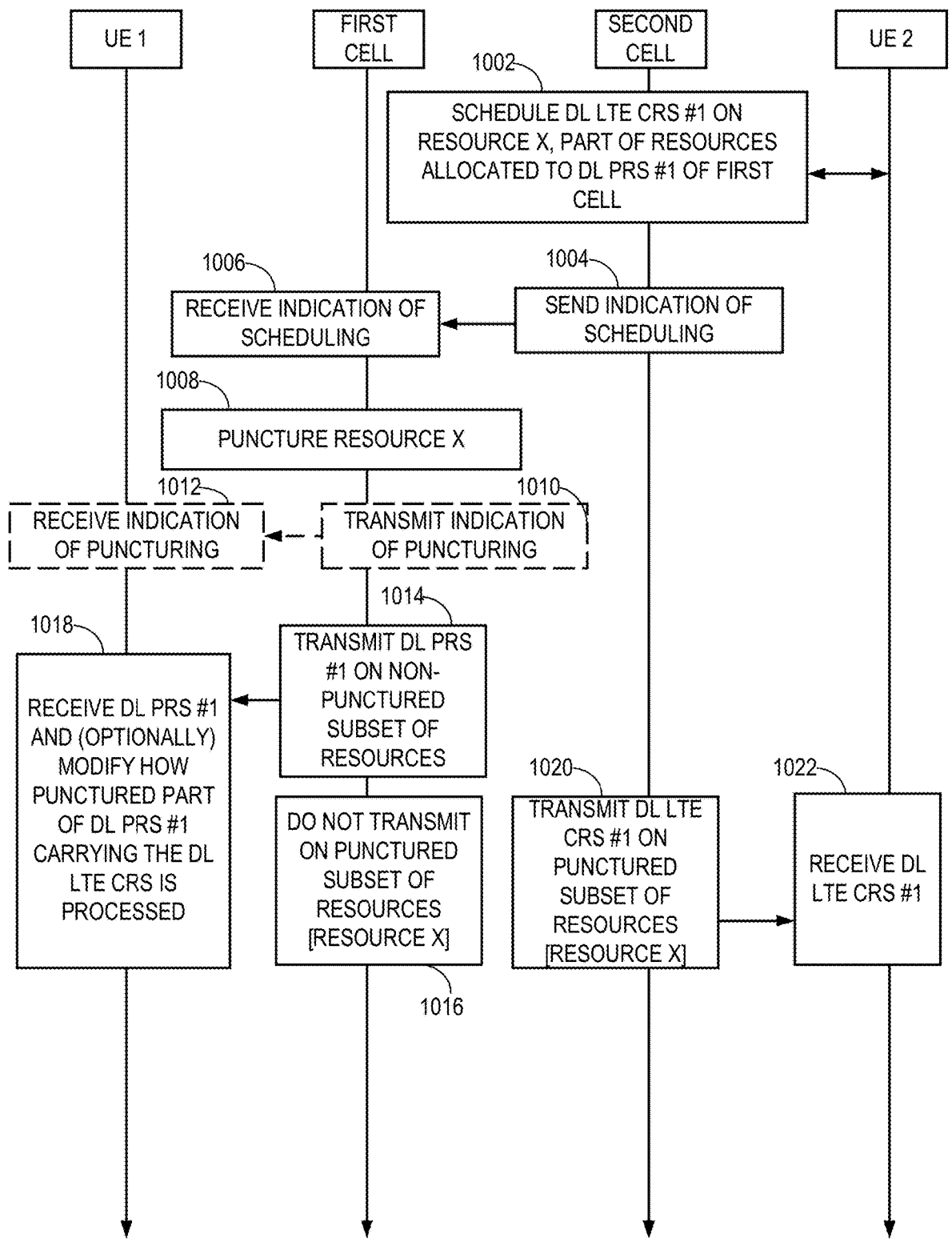
FIG. 10 illustrates an example implementation of the processes of FIGS. 6, 8 and 9 in accordance with an embodiment of the disclosure.

FIG. 10 illustrates an example implementation of the processes of 600 of FIG. 6, 800 of FIG. 8 and 900 of FIG. 9 in accordance with an embodiment of the disclosure.

At 1002 (e.g., as in 802 of FIG. 8), a second cell (e.g., second cell 805 of FIG. 8) schedules a DL LTE CRS on resource X, which is part of a set of resources allocated to transmission of DL PRS #1 by a first cell (e.g., first cell 905 of FIG. 9). At 1004-1006 (e.g., as in 902 of FIG. 9), the second cell transmits an indication of the scheduling to the first cell. At 1008 (e.g., as in 904 of FIG. 9), the first cell at least partially punctures resource X from resources allocated to DL PRS #1 which is targeted to UE 1 (and possibly other UEs if DL PRS #1 is multicast/broadcast). At 1010-1012 (e.g., as in 602 of FIG. 6), the cell optionally notifies UE 1 of the puncturing. In an example, the notification at 1010-1012 could be arranged to apply to multiple periodic instances of DL PRS #1 in other embodiments.

At 1014, the first cell transmits DL PRS #1 on the non-punctured subset of resources. Unlike 710 of FIG. 7, the first cell refrains from transmitting on the punctured subset of resources at 1016, which in this case correspond to at least part of resource X. At 1018, UE 1 receives DL PRS #1 on the non-punctured subset of resources and optionally modifies its processing of DL PRS #1 based on the associated puncturing (e.g., ignore the optional indication and treat as if the DL PRS #1 transmitted on resource X, deprioritize the part of DL PRS #1 on resource X, deprioritize reports based on DL PRS #1 based on the extent of the puncturing, etc.).

At 1020 (e.g., as in 804 of FIG. 8), the second cell transmits DL LTE CRS on resource X, which is received by UE 2 at 1022 (and possibly other UEs if the DL LTE CRS is multicast/broadcast). As will be appreciated, due to the inter-cell coordination between 1006-1012 in the embodiment of FIG. 10, interference on the transmission of DL LTE CRS at 1020-1022 on resource X can be reduced or eliminated.

Figure 11:
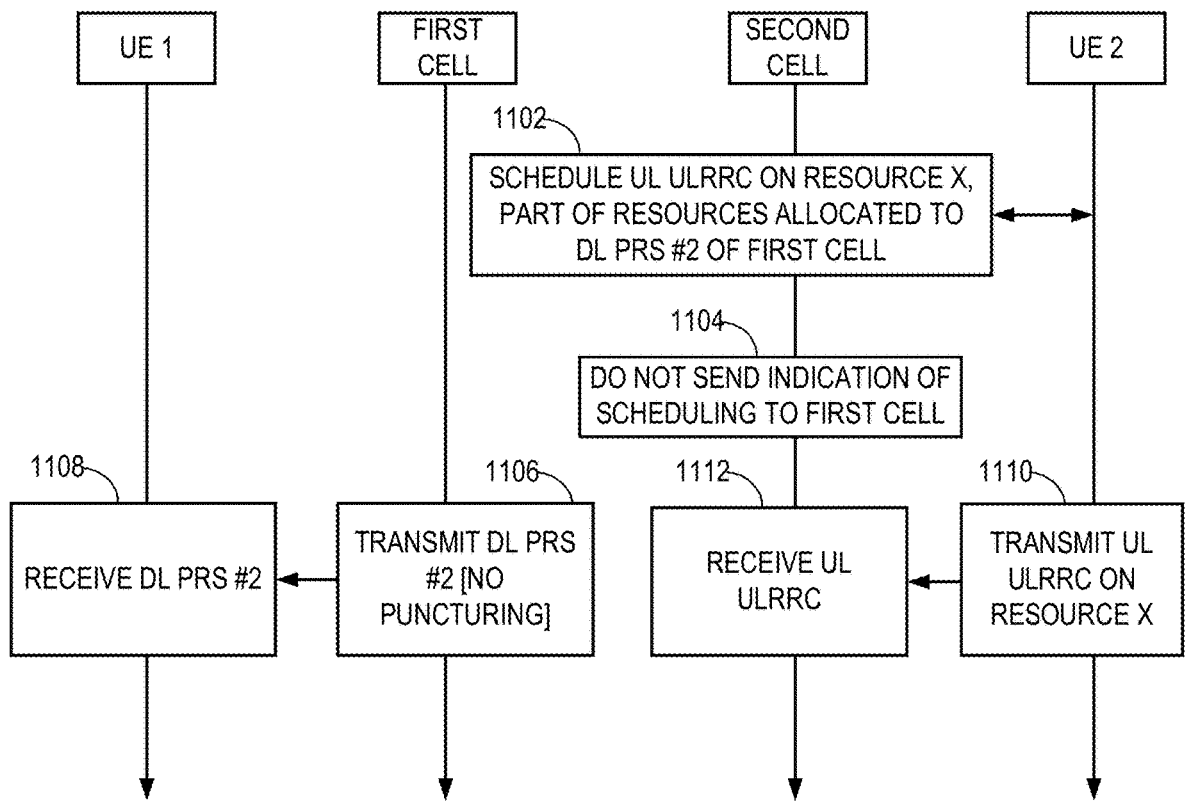
FIG. 11 illustrates an example implementation of the process of FIG. 8 in accordance with an embodiment of the disclosure.

FIG. 11 illustrates an example implementation of the process of 800 of FIG. 8 in accordance with an embodiment of the disclosure.

At 1102 (e.g., as in 802 of FIG. 8), a second cell (e.g., second cell 805 of FIG. 8) schedules a UL ULRRC on resource X, which is part of a set of resources allocated to transmission of DL PRS #2 by a first cell (e.g., first cell 905 of FIG. 9). Unlike the process described with respect to FIG. 10, at 1104, the second cell does not send an indication of its scheduling on resource X to the first cell. At 1106, the first cell transmits DL PRS #2 on the 'full' set of resources, including resource X, which is received by UE 1 at 1108.

At 1110 (e.g., as in 804 of FIG. 8), UE 2 transmits the UL ULRRC on resource X, which is received by the second cell at 1112. As will be appreciated, interference on the transmission of the UL ULRRC at 1110-1112 on resource X may be caused by the transmission of DL PRS #2 at 1106-1108, in contrast to the process of FIG. 10. However, the process of FIG. 11 may be implemented with little to no coordination between the first and second cells, which simplifies the implementation and reduces overhead.

It will be appreciated that FIGS. 5 and 9 can be broadly characterized as puncturing a set of resource allocated to transmission of PRS(s) to facilitate communication of one or more higher-priority signals on a punctured subset of the set of resources. In the case of FIG. 5, this puncturing is performed such that the punctured subset of resources may be repurposed by the same cell that performs the puncturing (e.g., for UL transmissions or DL transmissions by that same cell). By contrast, in the case of FIG. 9, this puncturing is performed by a first cell such that the punctured subset of resources may be used by a second cell.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or other such configurations).

The methods, sequences, and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in a user device (e.g., a UE) or a base station. In the alternative, the processor and the non-transitory computer-readable medium may be discrete components in a user device or base station.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects, those skilled in the art will appreciate that various changes and modifications could be made herein without departing from the scope of the disclosure as defined by the appended claims. Furthermore, in accordance with the various illustrative aspects described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method of operating a wireless node, comprising:
   puncturing a subset of a set of resources allocated to transmission of one or more Positioning Reference Signals (PRSs) to facilitate communication of one or more other signals on the punctured subset of the set of resources; and
   communicating at least one of the one or more PRSs on a non-punctured subset of the set of resources,
   wherein the one or more PRSs correspond to one or more uplink PRSs and the punctured subset of the set of resources is punctured from uplink PRS resources associated with the one or more uplink PRSs.

2. The method of claim 1,
   wherein the communicating receives the at least one PRS from at least one user equipment (UE).

3. The method of claim 1, further comprising:
   communicating the one or more other signals on the punctured subset of the set of resources.

4. The method of claim 3,
   wherein the one or more other signals correspond to one or more uplink signals and the communicating receives the one or more uplink signals from at least one user equipment (UE), or
   wherein the one or more other signals correspond to one or more downlink signals and the communicating transmits the one or more downlink signals to the at least one UE.

5. The method of claim 3,
   wherein the one or more other signals correspond to one or more uplink transmissions by at least one user equipment (UE), wherein the puncturing includes:
   transmitting at least one instruction to the at least one UE to transmit the one or more other signals on the punctured subset of the set of resources.

6. The method of claim 3, wherein the one or more other signals correspond to one or more downlink transmissions, wherein the puncturing includes:
   transmitting at least one instruction to the at least one UE to decode the one or more other signals on the punctured subset of resources instead of transmitting the one or more uplink PRSs.

7. The method of claim 1, wherein the one or more other signals are one or more downlink transmissions.

8. The method of claim 1,
   wherein the puncturing punctures the punctured subset of the set of resources in accordance with a threshold puncture ratio between the punctured subset of resources and the non-punctured subset of resources,
   wherein the puncturing punctures the punctured subset of the set of resources in accordance with a threshold bandwidth for the non-punctured subset of resources,
   wherein the puncturing punctures the punctured subset of the set of resources in accordance with a puncture pattern,
   wherein the puncturing is based on whether the one or more PRSs and/or the one or more other signals are transmitted aperiodically or periodically,
   wherein the puncturing is based on user equipment (UE) capability information and/or a UE configuration for a UE, or
   any combination thereof.

9. The method of claim 1, further comprising:
   notifying at least one user equipment (UE) of the puncturing.

10. The method of claim 9, wherein the notification is provided via a semi-static or dynamic slot format indication (SFI).

11. The method of claim 1,
    wherein the one or more other signals are for transmission by a second cell and are scheduled on the set of resources allocated to transmission of the one or more PRSs associated with a first cell.

12. The method of claim 11,
    wherein the punctured subset of the set of resources corresponds to uplink resources, and
    wherein the puncturing includes transmitting an instruction to at least one user equipment (UE) to modify transmission of at least one of the one or more uplink PRSs on the punctured subset of resources.

13. The method of claim 1, wherein the wireless node corresponds to a user equipment (UE).

14. The method of claim 1, wherein the wireless node corresponds to a cell.

15. A method of operating a user equipment (UE), comprising:
    receiving, from a first cell, an indication that a subset of a set of resources allocated to transmission of one or more Positioning Reference Signals (PRSs) are to be punctured; and
    selectively modifying a manner in which at least one of the one or more PRSs is processed at the UE in response to the indication,
    wherein the one or more PRSs correspond to one or more uplink PRSs and the punctured subset of the set of resources is punctured from uplink PRS resources associated with the one or more uplink PRSs.

16. The method of claim 15, further comprising:
    exchanging part of the one or more PRSs between the UE and a first cell on a non-punctured subset of the set of resources,
    wherein the selectively modifying communicates one or more other signals with the first cell or a second cell on the punctured subset of the set of resources.

17. The method of claim 15, further comprising:
exchanging part of the one or more PRSs between the UE and the first cell on a non-punctured subset of the set of resources,
wherein the selectively modifying reduces a transmission power of the at least one PRS by the UE on the punctured subset of the set of resources or prohibits any transmission of the at least one PRS by the UE on the punctured subset of the set of resources, or
wherein one or more downlink signals are transmitted on the punctured subset of the set of resources, or
any combination thereof.

18. The method of claim 15, wherein the received indication corresponds to a semi-static or dynamic slot format indication (SFI).

19. A wireless node, comprising:
a transceiver; and
at least one processor coupled to the transceiver and configured to:
puncture a subset of a set of resources allocated to transmission of one or more Positioning Reference Signals (PRSs) to facilitate communication of one or more other signals on the punctured subset of the set of resources; and
communicate at least one of the one or more PRSs on a non-punctured subset of the set of resources,
wherein the one or more PRSs correspond to one or more uplink PRSs and the punctured subset of the set of resources is punctured from uplink PRS resources associated with the one or more uplink PRSs.

20. The wireless node of claim 19,
wherein the communicating receives the at least one PRS from at least one user equipment (UE).

21. The wireless node of claim 19, wherein the at least one processor is further configured to:
communicate the one or more other signals on the punctured subset of the set of resources.

22. The wireless node of claim 21,
wherein the one or more other signals correspond to one or more uplink other signals and the at least one processor communicates the one or more other signals by receiving the one or more other signals from at least one user equipment (UE), or
wherein the one or more other signals correspond to one or more downlink other signals and one or more other signals by transmitting the one or more other signals to the at least one UE.

23. The wireless node of claim 21,
wherein the one or more other signals correspond to one or more uplink transmissions by at least one user equipment (UE), wherein the puncturing includes:
transmitting at least one instruction to the at least one UE to transmit the one or more other signals on the punctured subset of the set of resources.

24. The wireless node of claim 21, wherein the one or more other signals correspond to one or more downlink transmissions, wherein the at least one processor is further configured to:
transmit at least one instruction to the at least one UE to decode the one or more other signals on the punctured subset of resources instead of transmitting the one or more uplink PRSs.

25. The wireless node of claim 19, wherein the at least one processor is further configured to:
notify at least one user equipment (UE) of the puncturing.

26. The wireless node of claim 19, wherein the at least one processor is further configured to:
wherein the one or more other signals are for transmission by a second cell and are scheduled on the set of resources allocated to transmission of the one or more PRSs associated with a first cell.

27. The wireless node of claim 26,
wherein the punctured subset of the set of resources corresponds to uplink resources, and the at least one processor is further configured to transmit an instruction to at least one user equipment (UE) to modify transmission of at least one of the one or more uplink PRSs on the punctured subset of the set of resources.

28. A user equipment (UE), comprising:
a transceiver; and
at least one processor coupled to the transceiver and configured to:
receive, from a cell, an indication that a subset of a set of resources allocated to transmission of one or more Positioning Reference Signals (PRSs) are to be punctured; and
selectively modify a manner in which at least one of the one or more PRSs is processed at the UE in response to the indication,
wherein the one or more PRSs correspond to one or more uplink PRSs and the punctured subset of the set of resources is punctured from uplink PRS resources associated with the one or more uplink PRSs.

* * * * *